(12) United States Patent
Okuda

(10) Patent No.: US 7,495,738 B2
(45) Date of Patent: Feb. 24, 2009

(54) DISPLAY

(75) Inventor: Tatsumi Okuda, Motosu (JP)

(73) Assignee: Epson Imaging Devices Corporation, Tokyo (JP)

( * ) Notice: Subject to any disclaimer, the term of this patent is extended or adjusted under 35 U.S.C. 154(b) by 285 days.

(21) Appl. No.: 11/490,152

(22) Filed: Jul. 21, 2006

(65) Prior Publication Data

US 2007/0019275 A1    Jan. 25, 2007

(30) Foreign Application Priority Data

Jul. 22, 2005 (JP) ............................. 2005-213186
Jul. 22, 2005 (JP) ............................. 2005-213195
Jul. 26, 2005 (JP) ............................. 2005-215667

(51) Int. Cl.
*G02F 1/1345* (2006.01)
*G02F 1/15* (2006.01)

(52) U.S. Cl. .................... 349/150; 349/149; 349/58; 349/122; 359/265

(58) Field of Classification Search ................ 349/149, 349/150, 56, 58, 122, 138; 359/265
See application file for complete search history.

(56) References Cited

U.S. PATENT DOCUMENTS

| 5,442,470 | A | * | 8/1995 | Hashimoto | 349/58 |
| 5,461,087 | A | * | 10/1995 | Takahashi et al. | 522/80 |
| 6,825,894 | B2 | * | 11/2004 | Aoyagi et al. | 349/61 |
| 6,950,154 | B2 | * | 9/2005 | Lee | 349/58 |
| 7,292,290 | B2 | * | 11/2007 | Miyagawa et al. | 349/58 |
| 2004/0191509 | A1 | * | 9/2004 | Kishioka et al. | 428/354 |
| 2007/0019275 | A1 | * | 1/2007 | Okuda | 359/265 |

FOREIGN PATENT DOCUMENTS

| JP | 2004-117659 A | 4/2004 | ............ 349/150 X |
| JP | 2004-258291 A | 9/2004 | ............ 349/150 X |
| JP | 2005-173302 A | 6/2005 | ............ 349/150 X |

\* cited by examiner

*Primary Examiner*—Brian M Healy
(74) *Attorney, Agent, or Firm*—McDermott Will & Emery LLP

(57) ABSTRACT

A display allowing recycling of a flexible printed circuit board and a light source mounted thereon after disassembling of the flexible printed circuit board and the light source is obtained. In this display, the adhesive strength of a surface of a first double-faced adhesive tape bonded to the first flexible printed circuit board mounted with the light source is lower than the adhesive strength of another surface of the first double-faced adhesive tape bonded to the first display panel.

17 Claims, 16 Drawing Sheets

DISPLAY

BACKGROUND OF THE INVENTION

1. Field of the Invention

The present invention relates to a display, and more particularly, it relates to a display comprising a flexible printed circuit board mounted with a light source.

CROSS-REFERENCE TO RELATED APPLICATIONS

The priority applications Nos. JP2005-213186, JP2005-213195 and JP2005-215667 upon which this patent application is based are hereby incorporated by reference.

2. Description of the Background Art

A liquid crystal display comprising a flexible printed circuit board mounted with a light source is known in general (refer to Japanese Patent Laying-Open No. 2005-173302, for example). The aforementioned Japanese Patent Laying-Open No. 2005-173302 discloses a liquid crystal display manufactured by fitting a plurality of LEDs (light sources) mounted on a flexible printed circuit board into recess portions of a mold frame (resin frame) having a plurality of recess portions and a plurality of projecting portions respectively and bonding the projecting portions of the mold frame and a surface of the flexible printed circuit board mounted with the LEDs to each other through double-faced adhesive tapes arranged on the projecting portions located between the recess portions of the mold frame respectively, thereby fixing the flexible printed circuit board and the mold frame to each other.

An LCD unit, having a structure similar to that of the aforementioned Japanese Patent Laying-Open No. 2005-173302, including two display panels so that one of the display panels is bonded to a flexible printed circuit board mounted with a light source for supplying light to the display panels through a screen sheet formed by a double-faced adhesive tape is also known in general. FIG. 22 is a perspective view showing the structure a conventional LCD unit including two display panels, and FIG. 23 is an exploded perspective view of the conventional LCD unit shown in FIG. 22. FIGS. 24 and 25 are diagrams for illustrating the detailed structure of the conventional LCD unit shown in FIG. 22. The structure of the conventional LCD unit including two display panels is now described with reference to FIGS. 22 to 25.

The conventional LCD unit including two display panels includes a sub panel 110 and a main panel 120 having a display area 120a larger than a display area 110a of the sub panel 110, as shown in FIGS. 22 and 23.

In the sub panel 110, two glass substrates 111a and 111b are opposed to each other through a liquid crystal layer (not shown), as shown in FIG. 23. Polarizing plates 112a and 112b are arranged on surfaces of the glass substrates 111a and 111b opposite to the glass substrates 111b and 111a respectively. An area, enclosed with broken lines, within the region provided with the polarizing plate 112a (112b) forms the display area 110a of the sub panel 110, while the remaining region excluding the display area 110a forms a non-display area 110b. In a prescribed region of the non-display area 110b of the sub panel 110, a sub panel driver IC (integrated circuit) 113 is formed on the surface of the glass substrate 111a closer to the glass substrate 111b. A sub panel FPC (flexible printed circuit) 114 is connected to the sub panel driver IC 113.

The main panel 120 is similar in structure to the sub panel 110, except that the display area 120a is larger than the display panel 110a of the sub panel 110, as shown in FIG. 23. In other words, the main panel 120 includes two glass substrates 121a and 121b holding a liquid crystal layer (not shown) therebetween, polarizing plates 122a and 122b arranged on the surfaces of the glass substrates 121a and 121b respectively, a main panel driver IC 123 formed on the surface of the glass substrate 121a and a main panel FPC 124 connected to the main panel driver IC 123. The remaining region of the main panel 120 excluding the display area 120a forms a non-display area 120b.

In the conventional LCD unit, the sub panel 110 is arranged on a resin frame 131, while the main panel 120 is arranged under the resin frame 131. More specifically, the resin frame 131 of the LCD unit is in the form of a rectangular frame. Engaging sections 131a for a bezel (metallic frame) 143 described later are formed on the surfaces of the long and short sides of the rectangular resin frame 131 respectively, to protrude outward. Further, engaging sections 131b for a reinforcing plate 139 described later are formed on the short sides of the resin frame 131 respectively, to protrude outward. Locating pins 131c for a common FPC 142 described later are formed on coupling portions coupling the first short side and the two long sides of the resin frame 131 with each other respectively, to protrude toward the sub panel 110. A notch 131e is formed on a side of the first short side of the resin frame 131 closer to the main panel 120.

An LED-FPC 134 mounted with LEDs (light-emitting diodes) 133 is bonded to a surface of the notch 131e of the resin frame 131 closer to the main panel 120 through a double-faced adhesive tape 132 having high adhesive strength (bond strength) on both surfaces thereof. A light guide 135 is attached within the resin frame 131. Two lens sheets 136 and a diffusion sheet 137 are arranged on a surface of the light guide 135 closer to the sub panel 110 successively from the side closer to the light guide 135. A screen sheet 138 having an opening 138a is arranged on a surface of the diffusion sheet 137 closer to the sub panel 110. The opening 138a of the screen sheet 138 is provided on a region corresponding to the display area 110a of the sub panel 110. The screen sheet 138 is bonded to the resin frame 131.

The reinforcing plate 139 in the form of a rectangle is arranged on a surface of the screen sheet 138 closer to the sub panel 110. This reinforcing plate 139 is formed with openings 139a and 139b. The openings 139a and 139b of the reinforcing plate 139 are provided on regions corresponding to the display area 110a of the sub panel 110 and the sub panel driver IC 113 respectively. Engaging holes 139c engaging with the engaging sections 131b of the resin frame 131 are formed on regions of the reinforcing plate 139 corresponding to the engaging sections 131b of the resin frame 131 respectively. Long holes 139d are formed on regions of the reinforcing plate 139 corresponding to the locating pins 131c of the resin frame 131 respectively. The engaging holes 139c of the reinforcing plate 139 engage with the engaging sections 131b of the resin frame 131 respectively, thereby fixing the reinforcing plate 139 to the resin frame 131. The locating pins 131c of the resin frame 131 protrude toward the sub panel 110 through the long holes 139b of the reinforcing plate 139. The reinforcing plate 139 is formed with locating protrusions 139e protruding toward the sub panel 110, to enclose three sides of the sub panel 110 (glass substrate 111a), as shown in FIG. 24. Double-faced adhesive tapes 140 and 141 are bonded to the surface of the reinforcing plate 139 closer to the sub panel 110, as shown in FIG. 23.

The common FPC 142 is bonded to the surface of the reinforcing plate 139 closer to the sub panel 110 through the double-faced adhesive tape 140. This common FPC 142 is used for both of the sub panel 110 and the main panel 120 in common. The common FPC 142 has an opening 142a provided on a region corresponding to the sub panel 110. Locating holes 142 are formed on regions of the common FPC 142 corresponding to the locating pins 131c of the resin frame 131 respectively. The common FPC 142 bonded to the reinforcing plate 139 is located with respect to the resin frame 131 through the locating holes 142 thereof and the locating pins 131c of the resin frame 131. Further, the common FPC 142 is mounted with connectors 142c receiving terminals 134a and 114a of the LED-FPC 134 and the sub panel FPC 114 respectively. The common FPC 142 is also mounted with connectors 142e other than the connectors 142c and 142d. This common FPC 142 is connected to the main panel FPC 124. The sub panel 110 is bonded to the reinforcing plate 139 with the double-faced adhesive tape 141 through the opening 142a of the common FPC 142. The sub panel 110 bonded to the reinforcing plate 139 is so located by the locating protrusions 139e of the reinforcing plate 139 that the display area 110a thereof is arranged in the opening 139a of the reinforcing plate 139.

The bezel (metallic frame) 143 in the form of a rectangle is arranged on the sub panel 110. This bezel 143 has an opening 143a, which is provided on a region corresponding to the display area 110a of the sub panel 110. Thus, the display area 110a of the sub panel 110 is exposed through the opening 143a of the bezel 143. Engaging holes 143b are formed on regions of the bezel 143 corresponding to the engaging sections 131a of the resin frame 131 respectively. The engaging holes 143b of the bezel 143 engage with the engaging holes 131a of the resin frame 131 respectively, thereby fixing the bezel 143 to the resin frame 131. The bezel 143 is also formed with openings 143c for exposing the connectors 142c to 142e mounted on the common FPC 142 respectively.

As shown in FIG. 22, the lower surface of a region of the bezel 143 close to the outer edge of the opening 143a and the upper surface of the region (non-display area 110b) of the sub panel 110 close to the outer edge of the display area 110a are bonded to each other through a double-faced adhesive tape 144.

As shown in FIGS. 23 and 25, two lens sheets 151 and a diffusion sheet 152 are arranged on the surface of the light guide 135 closer to the main panel 120 successively from the side closer to the light guide 135 within the resin frame 131. As shown in FIG. 23, a screen sheet 153, provided with an opening 153a, formed by a double-faced adhesive tape having high adhesive strength (bond strength) on both surfaces thereof is arranged on the surface of the diffusion sheet 152 closer to the main panel 120. The screen sheet 153 is bonded to the resin frame 131 and the LED-FPC 134 mounted with the LEDs 133. The main panel 120 is bonded to the screen sheet 153 within the resin frame 131.

In the conventional LCD unit shown in FIGS. 22 to 25, however, the LED-FPC 134 mounted with the LEDs 133 is bonded to the main panel 120 and the resin frame 131 through the screen sheet 153 formed by the double-faced adhesive tape having high adhesive strength (bond strength) on both surfaces thereof and the double-faced adhesive tape 132 having high adhesive strength on both surfaces thereof respectively, and hence a large load is disadvantageously applied to the LED-FPC 134 mounted with the LEDs 133 when the main panel 120 is disassembled from the resin frame 131 (see FIG. 23), as shown in FIG. 26. Therefore, the LEDs 133 mounted on the LED-FPC 134 may disadvantageously be broken or disconnected. Consequently, the LEDs 133 and the LED-FPC 134 are hard to recycle when the LCD unit is reassembled.

SUMMARY OF THE INVENTION

The present invention has been proposed in order to solve the aforementioned problem, and an object of the present invention is to provide a display allowing recycling of a flexible printed circuit board and a light source mounted thereon after disassembling of the flexible printed circuit board and the light source.

In order to attain the aforementioned object, a display according to a first aspect of the present invention comprises a first display panel, a light source for supplying light to the first display panel, a first flexible printed circuit board mounted with the light source and a first double-faced adhesive tape for attaching the first flexible printed circuit board to the first display panel, and the adhesive strength of a surface of the first double-faced adhesive tape bonded to the first flexible printed circuit board is lower than the adhesive strength of another surface of the first double-faced adhesive tape bonded to the first display panel.

In the display according to the first aspect, as hereinabove described, the adhesive strength of the surface of the first double-faced adhesive tape bonded to the first flexible printed circuit board is lower than the adhesive strength of another surface of the first double-faced adhesive tape bonded to the first display panel, whereby the first flexible printed circuit board bonded to the first display panel through the first double-faced adhesive tape can be easily separated from the first display panel due to the lower adhesive strength of the surface of the first double-faced adhesive tape bonded to the first flexible printed circuit board as compared with the adhesive strength of another surface bonded to the first display panel. Thus, no large force is required for separating the first flexible printed circuit board bonded to the first display panel, whereby the first flexible printed circuit board can be prevented from application of a large load. Thus, the first flexible printed circuit board can be inhibited from deformation resulting from a large load applied thereto, whereby the light source mounted on the first flexible printed circuit board can be inhibited from breakage and the first flexible printed circuit board can be inhibited from disconnection. Consequently, the first flexible printed circuit board bonded to the first display panel through the first double-faced adhesive tape as well as the light source can be separated in a recyclable state, whereby the display can be reassembled with the recyclable first flexible printed circuit board and the recyclable light source.

In the aforementioned display according to the first aspect, the first double-faced adhesive tape preferably has adhesive strength allowing separation of the first flexible printed circuit board and the light source in a recyclable state when the first flexible printed circuit board is separated from the first display panel. According to this structure, the first flexible printed circuit board and the light source can be easily recycled.

The aforementioned display according to the first aspect preferably further comprises a frame for setting the light source mounted on the first flexible printed board and a screen sheet formed by a double-faced adhesive tape for bonding the first display panel and the frame to each other, while the first double-faced adhesive tape is preferably arranged between the screen sheet and the first flexible printed circuit board, and the adhesive strength of the surface of the first double-faced adhesive tape bonded to the first flexible printed circuit board is preferably lower than the adhesive strength of surfaces of the screen sheet bonded to the first double-faced adhesive tape and the first display panel respectively. According to this structure, the first flexible printed circuit board bonded to the screen sheet through the first double-faced adhesive tape can be easily separated from the screen sheet due to the lower adhesive strength of the surface of the first double-faced adhesive tape bonded to the first flexible printed circuit board as compared with the adhesive strength of the surfaces of the screen sheet bonded to the first double-faced adhesive tape and the first display panel. Consequently, the first flexible printed circuit board bonded to the screen sheet through the first double-faced adhesive tape as well as the light source can be separated in a recyclable state, whereby the display can be reassembled with the recyclable first flexible printed circuit board and the recyclable light source.

The aforementioned display comprising the frame preferably further comprises a second double-faced adhesive tape for bonding the frame and the first flexible printed circuit board to each other, and the adhesive strength of the surface of the first double-faced adhesive tape bonded to the first flexible printed circuit board is preferably lower than the adhesive strength of surfaces of the second double-faced adhesive tape bonded to the frame and the first flexible printed circuit board respectively. According to this structure, the first flexible printed circuit board can be bonded to the first display panel with weak adhesive force through the first double-faced adhesive tape having lower adhesive strength while strongly bonding the first flexible printed circuit board to the frame through the second double-faced adhesive tape having higher adhesive strength. Consequently, the first flexible printed circuit board strongly bonded to the frame can be easily separated from the first display panel.

In the aforementioned display comprising the screen sheet, the first double-faced adhesive tape is preferably so arranged on the screen sheet as to correspond to at least a partial region of the first flexible printed circuit board. According to this structure, the first double-faced adhesive tape arranged on the screen sheet is bonded to at least the partial region of the first flexible printed circuit board, whereby the first flexible printed circuit board can be easily separated from the first display panel to which the screen sheet is bonded dissimilarly to a case of bonding the overall region of the first flexible printed circuit board to the screen sheet having the adhesive strength higher than that of the first double-faced adhesive tape.

In the aforementioned display comprising the screen sheet, the outline of the screen sheet is preferably so quadrangularly formed as to correspond to the outline of the first display panel in plan view, and the first double-faced adhesive tape is preferably provided along a portion around an end of a prescribed side of the screen sheet having the quadrangular outline. According to this structure, the first flexible printed circuit board is bonded to the first double-faced adhesive tape having low adhesive strength provided along the portion around the end of the prescribed side of the screen sheet, not to be strongly bonded to the portion around the end of the prescribed side of the screen sheet having high adhesive strength. Thus, the first flexible printed circuit board can be more easily separated from the portion around the end of the screen sheet.

The aforementioned display according to the first aspect preferably further comprises a light guide so quadrangularly formed as to correspond to the first display panel for guiding the light emitted from the light source mounted on the first flexible printed circuit board to the first display panel, and the first flexible printed circuit board mounted with the light source is preferably so bonded to the first display panel with the first double-faced adhesive tape as to arrange the light source on a position opposed to the surface of a prescribed side of the light guide. According to this structure, the first flexible printed circuit board and the light source can be separated from the first display panel in a recyclable state due to the function of the first double-faced adhesive tape having low adhesive strength also when the light source is opposed to the surface of the prescribed side of the light guide.

In the aforementioned display comprising the light guide, the light source preferably includes a plurality of light-emitting diodes arranged along the extensional direction of the prescribed side of the light guide for applying the light to the surface of the prescribed side of the light guide. Also when the first flexible printed circuit board is mounted with the plurality of light-emitting diodes arranged along the extensional direction of the prescribed side of the light guide, the first flexible printed circuit board and the plurality of light-emitting diodes can be separated from the first display panel in a recyclable state due to the function of the first double-faced adhesive tape having low adhesive strength.

The aforementioned display comprising the light guide preferably further comprises a second display panel opposed to the first display panel through the light guide, and the light source and the light guide mounted on the first flexible printed circuit board are preferably used for the first display panel and the second display panel in common. According to this structure, the first flexible printed circuit board and the light source can be recycled when the first display panel and the first flexible printed circuit board mounted with the light source are detached from each other due to the function of the first double-faced adhesive tape having low adhesive strength in the display including the first and second display panels using the light source and the light guide in common.

In the aforementioned display comprising the second display panel, the first display panel may be a main panel, and the second display panel may be a sub panel smaller than the main panel.

The aforementioned display comprising the second display panel preferably further comprises a second flexible printed circuit board connected to the first display panel and the second display panel, and the first flexible printed circuit board mounted with the light source is preferably connected to the second flexible printed circuit board. According to this structure, the first flexible printed circuit board can be easily separated from the first display panel due to the function of the first double-faced adhesive tape having low adhesive strength after the first flexible printed circuit board mounted with the light source is separated from the first display panel in the state connected to the second flexible printed circuit board, whereby the second flexible printed circuit board can be inhibited from deformation through the first flexible printed circuit board separated from the first display panel. Thus, the first and second flexible printed circuit boards and the light source can be recycled.

A display according to a second aspect of the present invention comprises a first frame having an opening, a first display panel, having a display area and a non-display area, opposed to the first frame for exposing the display area from the opening of the first frame and a buffer member arranged between the first frame and the surface of the first display panel not to be bonded to the surface of the first display panel.

The display according to the second aspect, having the buffer member arranged between the first frame and the surface of the first display panel as hereinabove described, can absorb external force applied from the side of the first frame with the buffer member. Thus, the external force applied from the side of the first frame can be inhibited from transmission to the first display panel, whereby the first display panel can be inhibited from cracking. Further, the buffer member is arranged between the first frame and the surface of the first display panel not to be bonded to the surface of the first display panel so that no force is generated to pull the first frame toward the first display panel when the first frame is detached from the first display panel along with the buffer member, whereby the first frame can be inhibited from deformation. Consequently, the first frame can be recycled after disassembling of the display (after the first frame is detached from the first display panel).

In the aforementioned display according to the second aspect, the buffer member is preferably made of a foaming material. According to this structure, the display can easily absorb the external force applied from the side of the first frame with the buffer member of the foaming material.

In the aforementioned display according to the second aspect, the buffer member is preferably arranged between the first frame and the surface of the first display panel to enclose the display area of the first display panel. According to this structure, the external force applied from the side of the first frame can be inhibited from transmission to a region (non-display area) enclosing the display area of the first display panel.

In this case, the buffer member is preferably attached along the surface of a portion around the outer edge of the opening of the first frame closer to the first display panel. According to this structure, the buffer member can be easily arranged between the first frame and the surface of the first display panel to enclose the display area of the first display panel.

In the aforementioned display according to the second aspect, the first frame is preferably metallic, the buffer member is preferably arranged between the surface of the portion around the outer edge of the opening of the first frame and the surface of the first display panel, and a recess portion is preferably formed by drawing at least partially in the outer edge of the opening of the metallic first frame. According to this structure, torsional strength of the metallic first frame can be improved due to the recess portion formed by drawing. Thus, the first frame can be further inhibited from deformation when detached from the first display panel. Further, the torsional strength of the first frame can be improved due to the recess portion formed by drawing, whereby the first frame can be inhibited from warpage. Thus, the surface of the first display panel and the buffer member can be inhibited from forming a noncontact portion (clearance) resulting from deformation of the buffer member caused by warpage of the first frame. Consequently, introduction of dust or leakage of light through a clearance between the surface of the display panel and the buffer member can be suppressed.

A display according to a third aspect of the present invention comprises a first display panel, a flexible printed circuit board electrically connected to the first display panel, a reinforcing member arranged on the back surface of the flexible printed circuit board and one double-faced adhesive tape arranged between the flexible printed circuit board and the reinforcing member for bonding the flexible printed circuit board and the reinforcing member to each other, while the adhesive strength of a surface of the one double-faced adhesive tape bonded to the flexible printed circuit board is lower than the adhesive strength of another surface of the one double-faced adhesive tape bonded to the reinforcing member.

In the display according to the third aspect, as hereinabove described, the adhesive strength of the surface of the one double-faced adhesive tape bonded to the flexible printed circuit board is lower than the adhesive strength of another surface of the one double-faced adhesive tape bonded to the reinforcing member, whereby the flexible printed circuit board bonded to the reinforcing member through the one double-faced adhesive tape can be easily separated from the reinforcing member due to the lower adhesive strength of the surface of the one double-faced adhesive tape bonded to the flexible printed circuit board as compared with the adhesive strength of another surface bonded to the reinforcing member. Thus, no large force is required for separating the flexible printed circuit board from the reinforcing member, whereby application of large force to the flexible printed circuit board can be suppressed. Thus, the flexible printed circuit board can be inhibited from deformation resulting from large force applied thereto, whereby an electronic component mounted on the flexible printed circuit board can be inhibited from a contact failure and wires of the flexible printed circuit board can be inhibited from disconnection. Further, application of large force to the reinforcing member can also be suppressed, whereby the reinforcing member can be inhibited from deformation resulting from large force applied thereto. Consequently, the flexible printed circuit board and the reinforcing member bonded to each other through the one double-faced adhesive tape can be separated from each other in a recyclable state, whereby the display can be reassembled with the recyclable flexible printed circuit board and the recyclable reinforcing member. Further, the flexible printed circuit board can be so easily separated from the reinforcing member that the position for bonding the flexible printed circuit board can be easily corrected in assembling, whereby workability in assembling can be improved.

In the aforementioned display according to the third aspect, a connector is preferably mounted on the surface of the flexible printed board, and the one double-faced adhesive tape preferably has adhesive strength allowing no debonding between the reinforcing member and the flexible printed board when a connecting terminal connected to the connector of the flexible printed circuit board is attached/detached while allowing separation of the first flexible printed circuit board in a recyclable state when the flexible printed circuit board is separated from the reinforcing member. According to this structure, the flexible printed circuit board and the reinforcing member can be inhibited from separation also when force is applied in a direction for separating the flexible printed circuit board and the reinforcing member from each other due to the connecting terminal attached/detached to/from the connector of the flexible printed circuit board. Consequently, the connecting terminal can be attached/detached to/from the connector of the flexible printed circuit board without separating the flexible printed circuit board and the reinforcing member from each other despite the one double-faced adhesive tape allowing separation of the flexible printed circuit board in a recyclable state.

In the aforementioned display according to the third aspect, the reinforcing member preferably includes a first opening on a portion corresponding to a display area of the first display panel, the other double-faced adhesive tape is preferably provided on an edge of the first opening of the reinforcing member for bonding the first display panel and the reinforcing member to each other, and the adhesive strength of the surface of the one double-faced adhesive tape bonded to the flexible printed circuit board is preferably lower than the adhesive strength of surfaces of the other double-faced adhesive tape bonded to the first display panel and the reinforcing member respectively. According to this structure, the first display panel can be strongly bonded to the reinforcing member through the other double-faced adhesive tape having high adhesive strength while bonding the flexible printed circuit board to the reinforcing member through the one double-faced adhesive tape having low adhesive strength to be separable in a recyclable state.

In the aforementioned display according to the third aspect, the flexible printed circuit board preferably includes a second opening so provided as to expose a display area of the first display panel, and the one double-faced adhesive tape is preferably so arranged on the side of the surface of the reinforcing member as to correspond to the remaining region of the flexible printed circuit board excluding the second opening. According to this structure, the flexible printed circuit board can be easily separated from the reinforcing member also when mechanical strength of the flexible printed circuit board is reduced due to the second opening provided on the flexible printed circuit board for exposing the display area of the first display panel, whereby the flexible printed circuit board reduced in mechanical strength due to the second opening can be inhibited from disconnection or the like. Consequently, the flexible printed circuit board provided with the second opening can be recycled after separation from the reinforcing member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an LCD unit according to this embodiment is described with reference to FIGS. 1 to 14.

Figure 1:
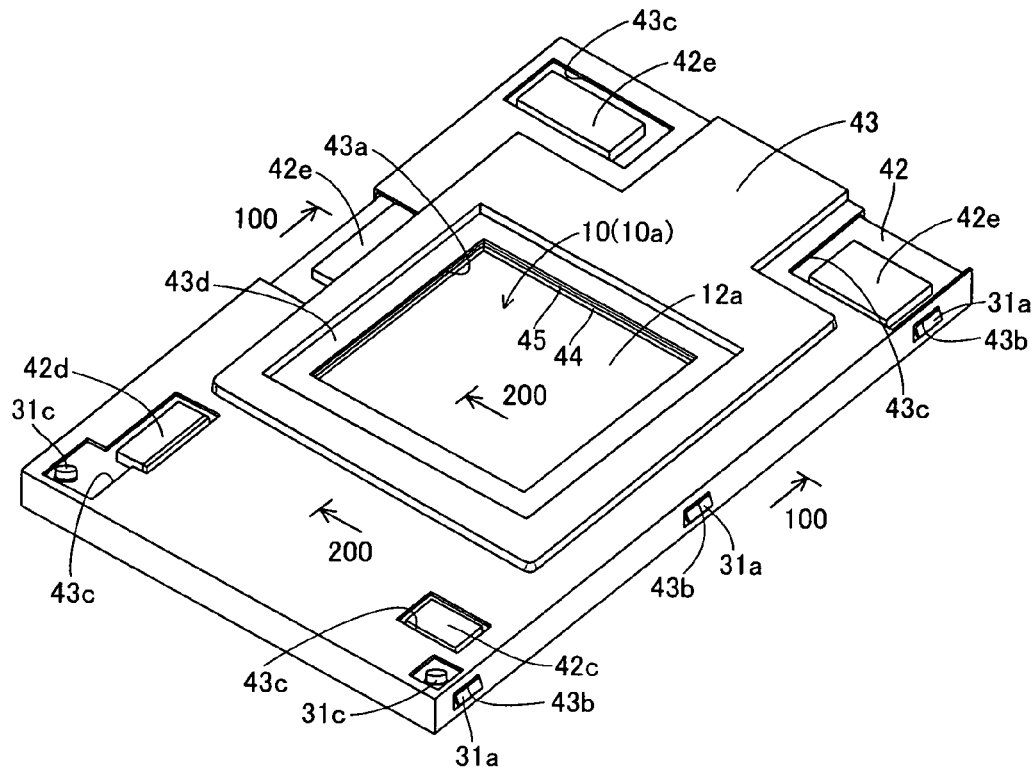
FIG. 1 is a perspective view showing an LCD unit according to an embodiment of the present invention as viewed from the side of a sub panel.
Figure 2:
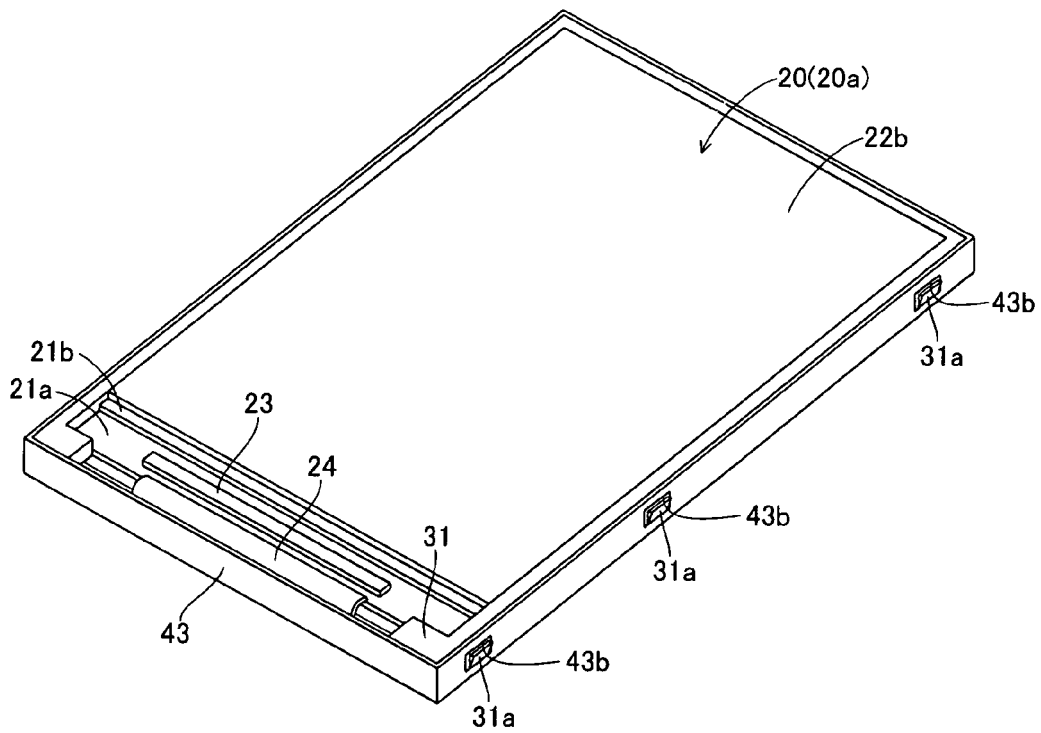
FIG. 2 is a perspective view showing the LCD unit according to the embodiment shown in FIG. 1 as viewed from the side of a main panel.

As shown in FIGS. 1 and 2, the LCD unit according to this embodiment includes a sub panel (upper panel) 10 and a main panel (lower panel) 20.

Figure 3:
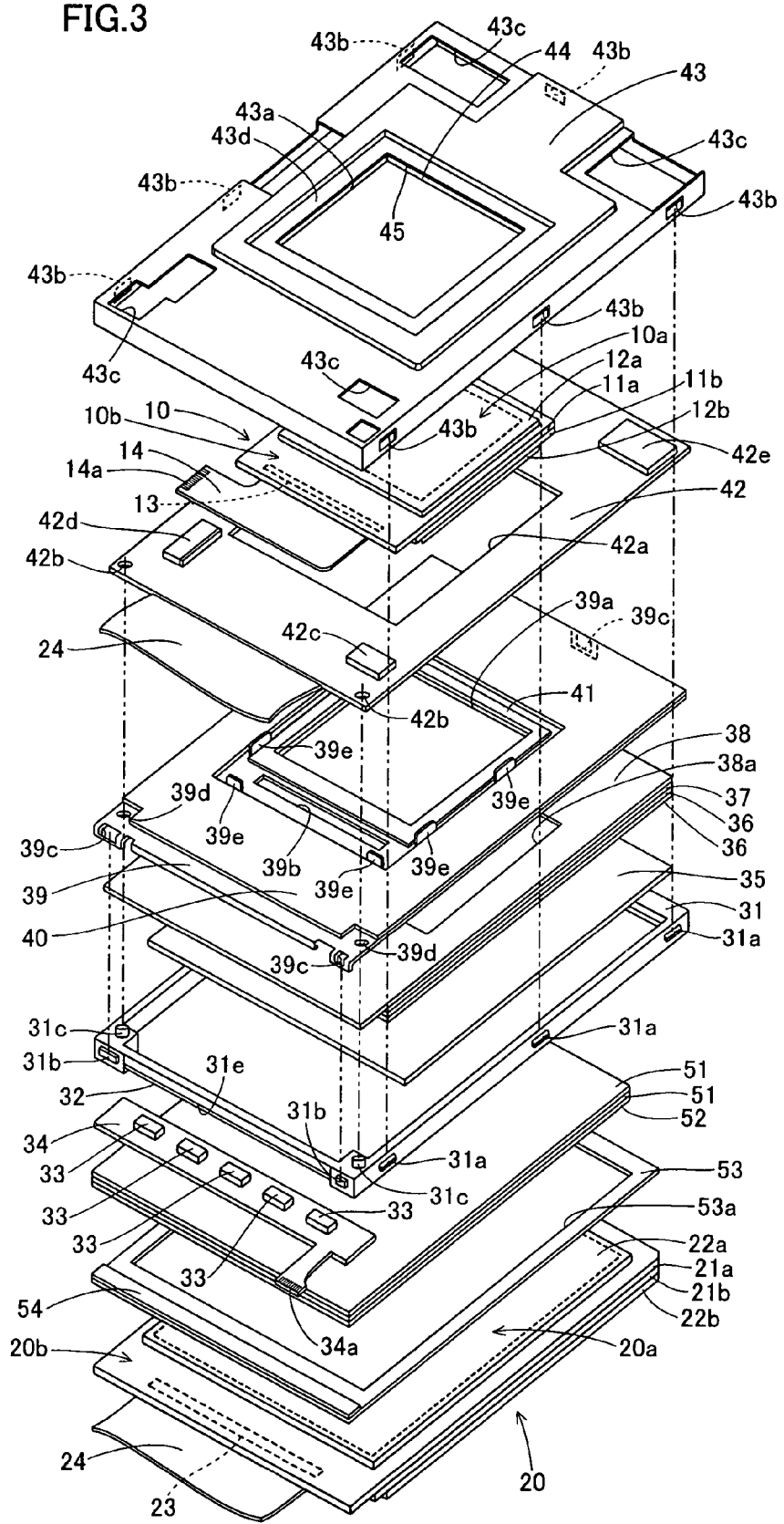
FIG. 3 is an exploded perspective view of the LCD unit according to the embodiment shown in FIG. 1.

In the sub panel 10, two glass substrates 11a and 11b are opposed to each other through a liquid crystal layer (not shown), as shown in FIG. 3. Polarizing plates 12a and 12b are arranged on surfaces of the glass substrates 11a and 11b opposite to the glass substrates 11b and 11a respectively. An area, enclosed with broken lines, within the region provided with the polarizing plate 12a (12b) forms a display area 10a of the sub panel 10, while the remaining region excluding the display area 10a forms a non-display area lob. In a prescribed region of the non-display area 10b of the sub panel 10, a sub panel driver IC 13 is formed on the surface of the glass substrate 11a closer to the glass substrate 11b. A sub panel FPC (flexible printed circuit) 14 is connected to the sub panel driver IC 13.

The main panel 20 arranged on the lower side in FIG. 3 is similar in structure to the sub panel 10. In other words, the main panel 20 includes two glass substrates 21a and 21b opposed to each other through a liquid crystal layer (not shown). Polarizing plates 22a and 22b are arranged on surfaces of the glass substrates 21a and 21b opposite to the glass substrates 11b and 11a respectively. An area, enclosed with broken lines, within the region provided with the polarizing plate 22a (22b) forms a display area 20a of the main panel 20, while the remaining region excluding the display area 20a forms a non-display area 20b. The display area 20a of the main panel 20 is rendered larger than the display area 10a of the sub panel 10. In a prescribed region of the non-display area 20b of the main panel 20, a main panel driver IC 23 is formed on the surface of the glass substrate 21a closer to the glass substrate 21b. A main panel FPC 24 is connected to the main panel driver IC 23.

Figure 6:
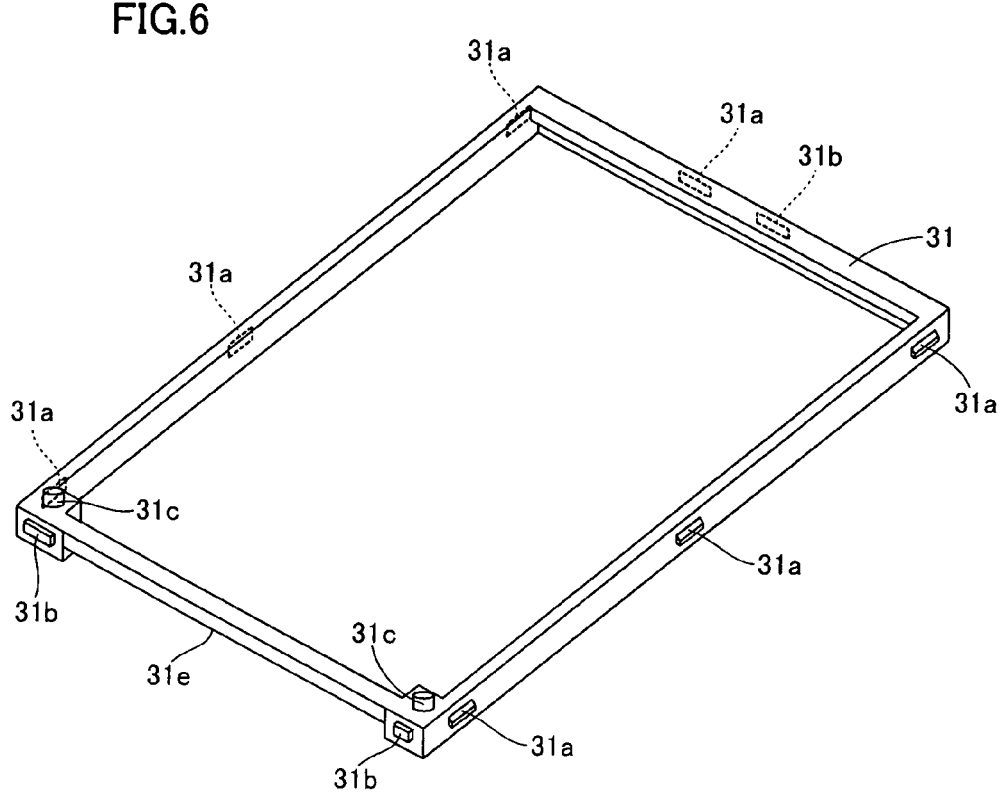
FIG. 6 is a perspective view showing a resin frame of the LCD unit according to the embodiment shown in FIG. 1 as viewed from the side of the sub panel.
Figure 7:
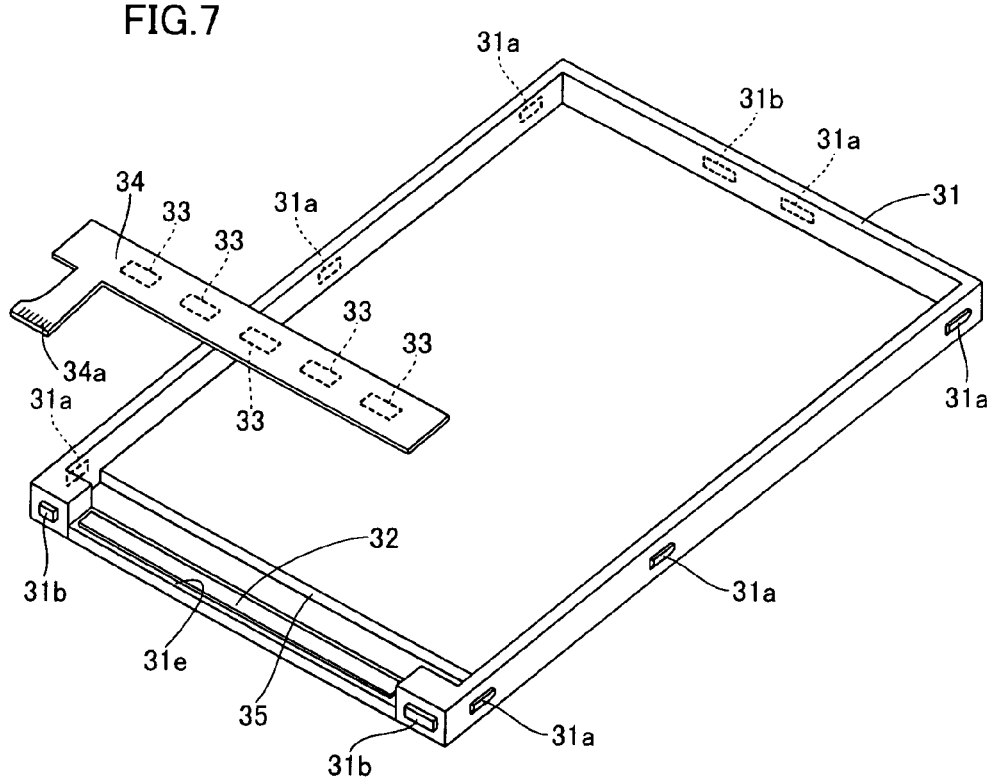
FIG. 7 is a perspective view showing the resin frame of the LCD unit according to the embodiment shown in FIG. 1 as viewed from the side of the main panel.

In the LCD unit according to this embodiment, the sub panel 10 and the main panel 20 are arranged on and under a resin frame 31 respectively. The resin frame 31 is an example of the "frame" in the present invention. More specifically, the resin frame 31 of the LCD unit is in the form of a rectangular frame including two long sides opposed to each other in the short-side direction and two short sides opposed to each other in the longitudinal direction, as shown in FIGS. 3, 6 and 7. Three engaging sections 31a for a bezel (metallic frame) 43 described later are formed on the surface of each of the two long sides of the resin frame 31 to protrude outward. A further engaging section 31a for the bezel 43 is formed on the surface of the first short side of the resin frame 31 to protrude outward. Further, an engaging section 31b for a reinforcing plate 39 described later is formed on the surface of the first short side of the resin frame 31 to protrude outward. Further engaging sections 31b for the reinforcing plate 39 are formed on both ends of the surface of the second short side of the resin frame 31 to protrude outward respectively. As shown in FIGS. 3 and 6, locating pins 31c for a common FPC 42 described later are formed on coupling portions coupling the second short side and the two long sides of the resin frame 31 with each other to protrude toward the sub panel 10 respectively. A notch 31e is formed on a side of the second short side of the resin frame 31 closer to the main panel 20.

As shown in FIGS. 3 and 7, an LED-FPC 34 mounted with LEDs (light-emitting diodes) 33 is bonded to a surface of the notch 31e of the resin frame 31 closer to the main panel 20 through a strong double-faced adhesive tape (No. 532 by Nitto Denko Corporation) having high adhesive strength on both surfaces thereof. The LEDs 33 are examples of the "light source" in the present invention, and the LED-FPC 34 is an example of the "first flexible printed circuit board" in the present invention. The strong double-faced adhesive tape 32 of about 6 μm in thickness is formed by a polyester film coated with strong adhesive layers on both surfaces thereof respectively.

The adhesive strength of the double-faced adhesive tape 32 according to this embodiment is now described. In order to separate the double-faced adhesive tape 32 from a stainless steel substrate by 20 mm in a direction of 180°, peel force of about 6.0 N is necessary. Therefore, the double-faced adhesive tape 32 is bonded to the stainless steel substrate with adhesive strength of about 6.0 N. In other words, the adhesive strength (about 2.5 N) of a weak adhesive layer 54b of a double-faced adhesive tape 54 (described later) bonded to the LED-FPC 34 is lower than the adhesive strength (about 6.0 N) of surfaces of the double-faced adhesive tape 32 bonded to the resin frame 31 and the LED-FPC 34 respectively.

A light guide 35 for guiding light emitted from the LEDs 33 to the sub panel 10 and the main panel 20 is attached within the resin frame 31. In other words, the LEDs 33 and the light guide 35 are used for the sub panel 10 and the main panel 20 in common.

As shown in FIG. 3, two lens sheets 36 and a diffusion sheet 37 are arranged on a surface of the light guide 35 closer to the sub panel 10 successively from the side closer to the light guide 35. The lens sheets 36 have a function of condensing light received from the light guide 35, while the diffusion sheet 37 has a function of diffusing light received from the lens sheets 36. A screen sheet 38 having an opening 38a is arranged on a surface of the diffusion sheet 37 closer to the sub panel 10. This screen sheet 38 has a function of inhibiting the light emitted from the LEDs 33 from leaking through any region of the sub panel 10 other than the display area 10a. In other words, the opening 38a of the screen sheet 38 is provided on a region corresponding to the display area 10a of the sub panel 10. The outer edge of the screen sheet 38 is bonded to the two long sides and the two short sides of the resin frame 31. Thus, the lens sheets 36 and the diffusion sheet 37 located between the light guide 35 and the screen sheet 38 are fixed to the resin frame 31.

Figure 8:
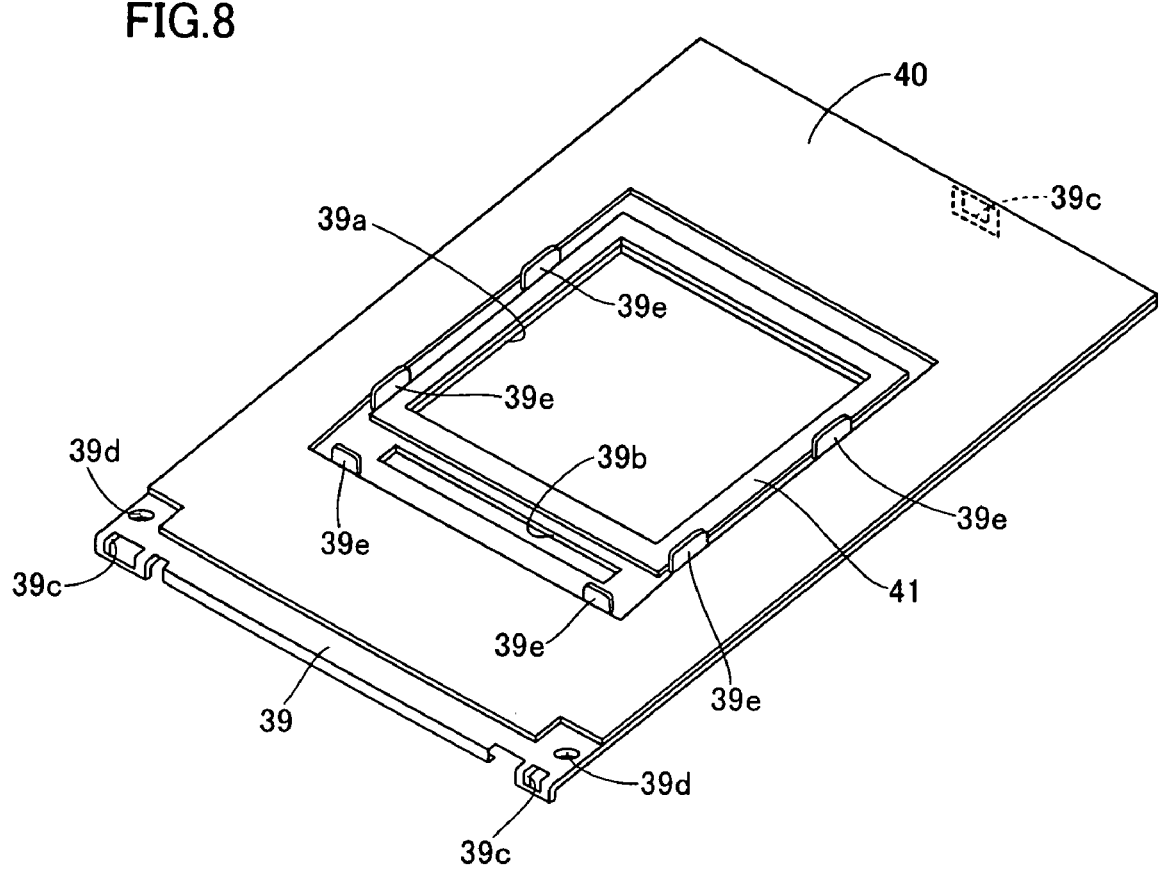
FIG. 8 is a perspective view of a reinforcing plate of the LCD unit according to the embodiment shown in FIG. 1, to which a double-faced adhesive tape is bonded.

The reinforcing plate 39 formed by a rectangular stainless steel sheet is arranged on a surface of the screen sheet 38 closer to the sub panel 10. This reinforcing plate 39 has a function of reinforcing the common FPC 42 described later. As shown in FIGS. 3 and 8, the reinforcing plate 39 has openings 39a and 39b provided on regions corresponding to the display area 10a of the sub panel 10 and the sub panel driver IC 13 respectively.

The reinforcing plate 39 is further formed with three engaging holes 39c engaging with the three engaging sections 31b of the resin frame 31 on regions corresponding to the engaging sections 31b of the resin frame 31 respectively. Further, long holes 39d are formed on regions of the reinforcing plate 39 corresponding to the two locating pins 31c of the resin frame 31 respectively. The three engaging holes 39c of the reinforcing plate 39 engage with the three engaging sections 31b of the resin frame 31 respectively, thereby fixing the reinforcing plate 39 to the resin frame 31. The locating pins 31c of the resin frame 31 protrude toward the sub panel 10 through the long holes 39d of the reinforcing plate 39.

A plurality of locating protrusions 39e protruding toward the sub panel 10 are formed on the reinforcing plate 39, to enclose three sides of the sub panel 10 (glass substrate 11a). The plurality of protrusions 39e of the reinforcing plate 39 have a function of locating the sub panel 10 with respect to the reinforcing plate 39 for arranging the display panel 10a of the sub panel 10 in the opening 39a of the reinforcing plate 39.

Figure 9:
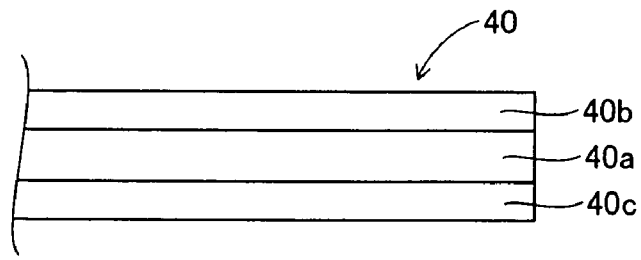
FIG. 9 is a schematic diagram of a weak double-faced adhesive tape used for bonding the reinforcing plate and a common FPC of the LCD unit according to the embodiment shown in FIG. 1.

A weak double-faced adhesive tape (No. 5690 by Nitto Denko Corporation) 40 is bonded to a surface of the reinforcing plate 39 closer to the sub panel 10. More specifically, the weak double-faced adhesive tape 40 is bonded to the reinforcing plate 39 to enclose a region of the reinforcing plate 39 corresponding to the sub panel 10. On the other hand, a strong double-faced adhesive tape 41 is bonded to a region along the outer edge of the opening 39a of the reinforcing plate 39 at a prescribed interval from the weak double-faced adhesive tape 40. As shown in FIG. 9, the weak double-faced adhesive tape 40 is formed by a polyester film 40a of about 12 μm in thickness coated with weak and strong adhesive layers 40b and 40c each having a thickness of about 9 μm on both surfaces thereof respectively. As shown in FIG. 3, the strong adhesive layer 40c (see FIG. 9) of the weak double-faced adhesive tape 40 is bonded to the surface of the reinforcing plate 39 closer to the sub panel 10. The weak adhesive layer 40b (see FIG. 9) of the weak double-faced adhesive tape 40 is bonded to a surface of the common FPC 42 closer to the main panel 20. In other words, the common FPC 42 is bonded to the surface of the reinforcing plate 39 closer to the sub panel 10 through the weak double-faced adhesive tape 40, as shown in FIGS. 3 and 9. The common FPC 42 is used for the sub panel 10 and the main panel 20 in common. The common FPC 42 is an example of the "second flexible printed circuit board" in the present invention.

The adhesive strength of the double-faced adhesive tape 40 according to this embodiment is now described. In order to separate the weak adhesive layer 40b of the double-faced adhesive tape 40 from a stainless steel substrate by 20 mm in a direction of 180°, peel force of about 2.5 N is necessary. Therefore, the weak adhesive layer 40b of the double-faced adhesive tape 40 is bonded to the stainless steel substrate with adhesive strength of about 2.5 N. In order to separate the strong adhesive layer 40c of the double-faced adhesive tape 40 from a stainless steel substrate by 20 mm in a direction of 180°, on the other hand, peel force of about 8.0 N is necessary. Therefore, the strong adhesive layer 40c is bonded to the stainless steel substrate with adhesive strength of about 8.0 N. In other words, the adhesive strength (about 2.5 N) of the weak adhesive layer 40b of the double-faced adhesive tape 40 bonded to the common FPC 42 is lower than the adhesive strength (about 8.0 N) of the strong adhesive layer 40c of the double-faced adhesive tape 40 bonded to the reinforcing plate 39.

According to this embodiment, further, the weak adhesive layer 40b of the double-faced adhesive tape 40 has the adhesive strength (2.5 N) allowing no debonding between the reinforcing plate 39 and the common FPC 42 when a terminal 34a of the LED-FPC 34 connected to a connector 42c of the common FPC 42 as described later and a terminal 14a of the sub panel FPC 14 connected to another connector 42d are attached/detached while allowing separation of the common FPC 42 from the reinforcing plate 39 in a recyclable state.

According to this embodiment, the strong double-faced adhesive tape (No. 532 by Nitto Denko Corporation) 41 is bonded to the surface of the reinforcing plate 39 closer to the sub panel 10. The double-faced adhesive tape 41 is an example of the "second double-faced adhesive tape" in the present invention. The strong double-faced adhesive tape 41 is bonded to the region along the outer edge of the opening 39a of the reinforcing plate 39 at the prescribed interval from the weak double-faced adhesive tape 40.

The adhesive strength of the double-faced adhesive tape 41 according to this embodiment is described. In order to separate the double-faced adhesive tape 41 from a stainless steel substrate by 20 mm in a direction of 180°, peel force of about 6.0 N is necessary. Therefore, the double-faced adhesive tape 41 is bonded to the stainless steel substrate with adhesive strength of about 6.0 N. In other words, the adhesive strength (about 2.5 N) of the weak adhesive layer 40b of the double-faced adhesive tape 40 bonded to the common FPC 42 is lower than the adhesive strength (about 6.0 N) of surfaces of the double-faced adhesive tape 41 bonded to the sub panel 10 and the reinforcing plate 39 respectively.

Figure 10:
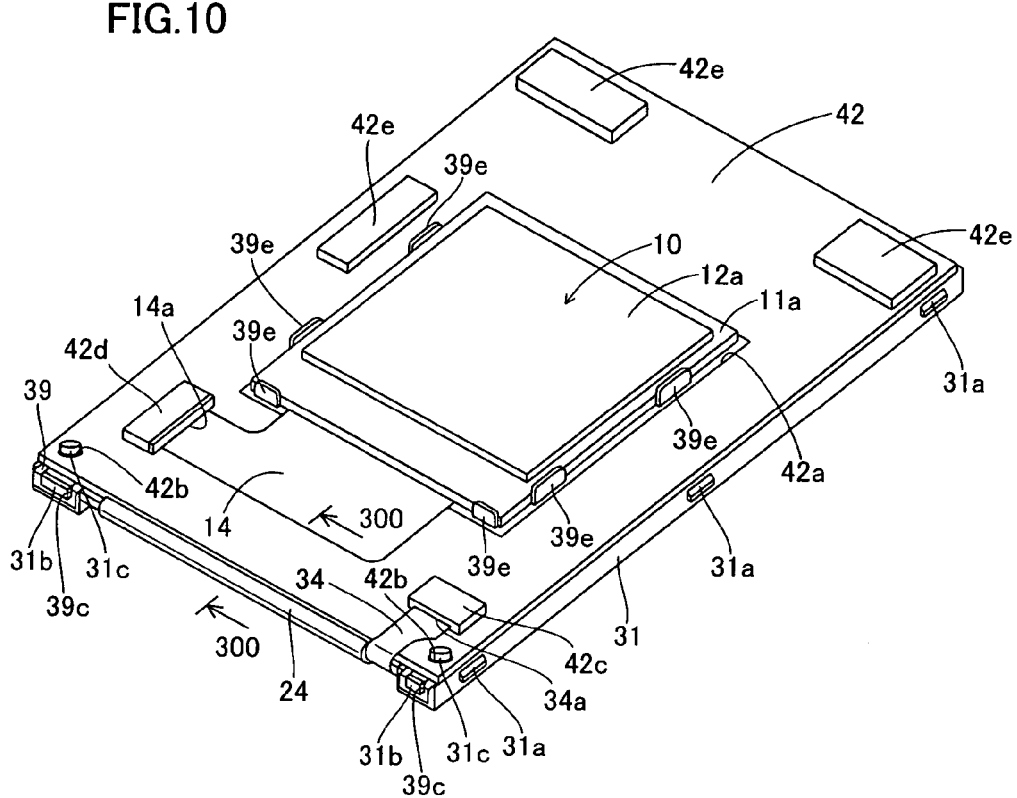
FIG. 10 is a perspective view of the LCD unit according to the embodiment shown in FIG. 1, from which a bezel is detached.

The common FPC 42 has an opening 42a, which is provided on a region corresponding to the sub panel 10. Therefore, the reinforcing plate 39 and the common FPC 42 are bonded to each other only through the weak double-faced adhesive tape 40 located on a prescribed region other than that corresponding to the sub panel 10. As shown in FIGS. 3 and 10, locating holes 42b are formed on regions of the common FPC 42 corresponding to the two locating pins 31c of the resin frame 31 respectively. The common FPC 42 bonded to the reinforcing plate 39 is located with respect to the resin frame 31 through the locating holes 42b of the common FPC 42 and the locating pins 31c of the resin frame 31. The connectors 42c and 42d receiving the terminal 34a of the LED-FPC 34 and the terminal 14a of the sub panel FPC 14 respectively are mounted on the common FPC 42. A plurality of connectors 42e are also mounted on the common FPC 42, in addition to the connectors 42c and 42d. The common FPC 42 is connected to the main panel FPC 24.

As shown in FIG. 3, the sub panel 10 is bonded to the reinforcing plate 39 through the opening 42a of the common FPC 42. More specifically, a region (non-display area 10b) of the sub panel 10 enclosing the display area 10a is bonded to the strong double-faced adhesive tape 41 located on the region along the outer edge of the opening 39a of the reinforcing plate 39. The sub panel 10 bonded to the reinforcing plate 39 is so located by the locating protrusions 39e of the reinforcing plate 39 that the display area be a is arranged in the opening 39a of the reinforcing plate 39.

Figure 12:
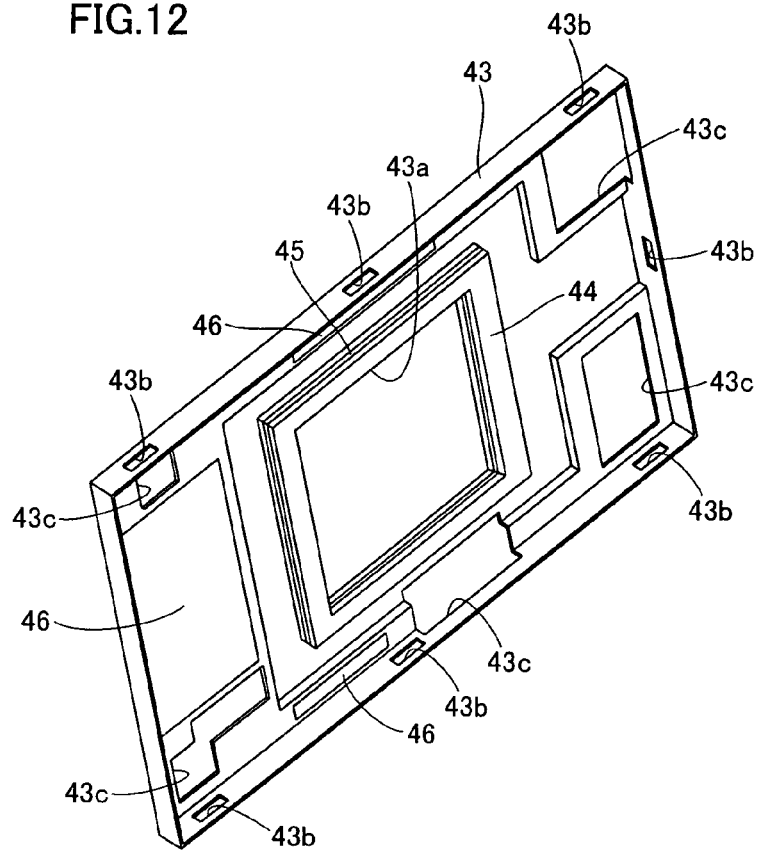
FIG. 12 is a perspective view of the bezel of the LCD unit according to the embodiment shown in FIG. 1.

The bezel (metallic frame) 43 formed by a rectangular stainless steel sheet is arranged on the sub panel 10. As shown in FIGS. 3 and 12, the bezel 43 has an opening 43a provided on a region corresponding to the display area 10a of the sub panel 10. Thus, the display area 10a of the sub panel 10 is exposed through the opening 43a of the bezel 43. Three engaging holes 43b are formed on each of two side surfaces of the bezel 43 opposite to each other along the short-side direction. An engaging hole 43b is formed on one of other two side surfaces of the bezel 43 opposite to each other along the longitudinal direction. The seven engaging holes 43b of the bezel 43 engage with the seven engaging sections 31a of the resin frame 31 respectively, thereby fixing the bezel 43 to the resin frame 31. The bezel 43 is further formed with openings 43c for exposing the connectors 42c to 42e mounted on the common FPC 42 respectively.

Figure 4:
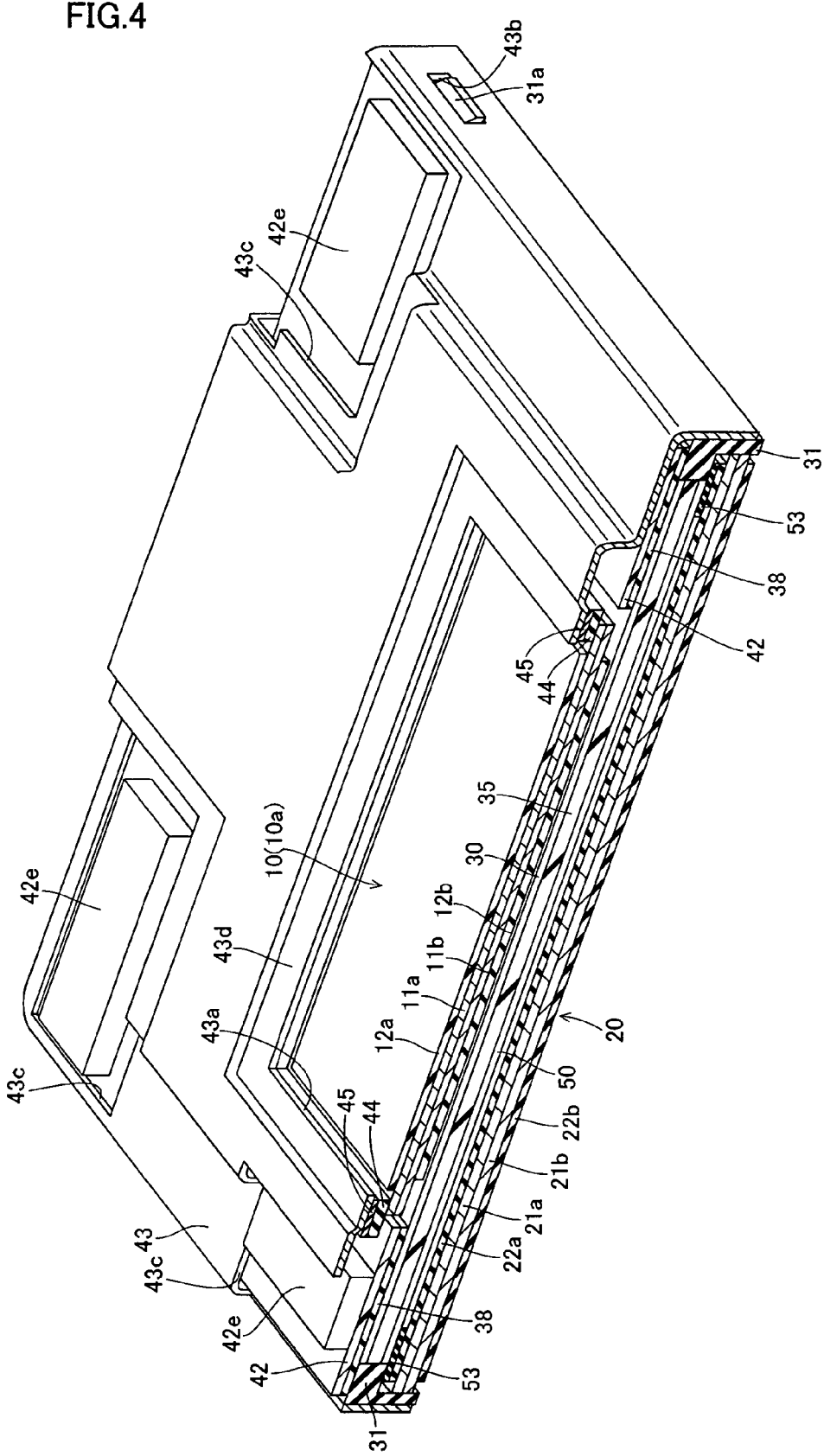
FIG. 4 is a sectional view taken along the line 100-100 in FIG. 1.

As shown in FIGS. 3, 4 and 12, a cushion layer 44 is arranged between the sub panel 10 and the bezel 43, not to be bonded to the surface of the sub panel 10. This cushion layer 44 is made of a foaming material (SCF-100 by Nitto Denko Corporation). The cushion layer 44 is an example of the "buffer member" in the present invention. The cushion layer 44 is bonded along the surface of a portion around the outer edge of the opening 43a of the bezel 43 closer to the sub panel 10 through a strong double-faced adhesive tape (No. 532 by Nitto Denko Corporation) 45.

Figure 5:
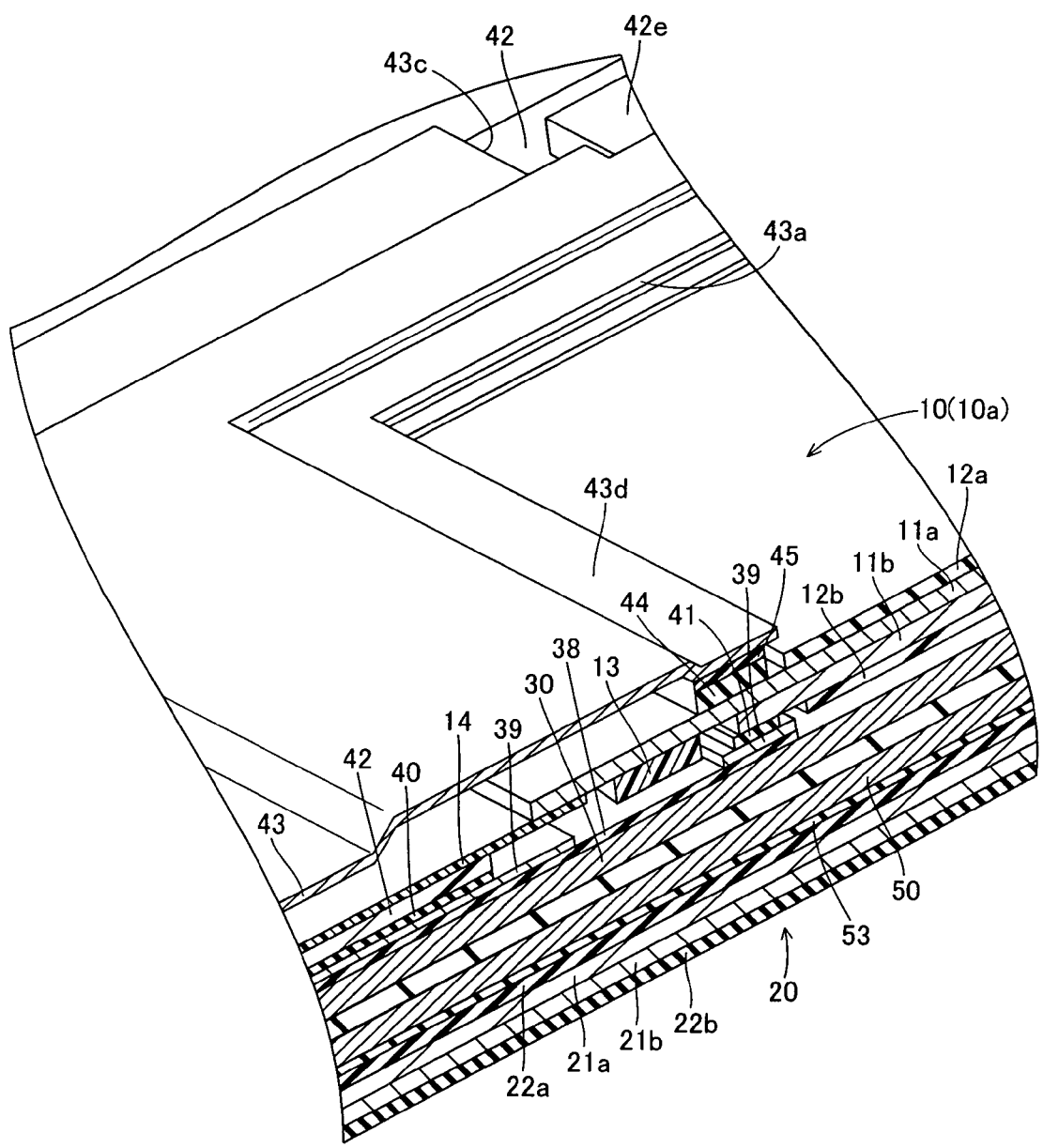
FIG. 5 is a sectional view taken along the line 200-200 in FIG. 1.

A recess portion 43d is formed by drawing along the overall region of the outer edge of the opening 43a of the bezel 43. The recess portion 43d of the bezel 43 has a thickness identical to that of the remaining portion of the bezel 43 excluding the recess portion 43d. The cushion layer 44 is bonded to a surface of the recess portion 43d of the bezel 43 closer to the sub panel 10. As shown in FIG. 5, the cushion layer 44 bonded to the surface of the recess portion 43d of the bezel 43 closer to the sub panel 10 is in contact with the surface of the sub panel 10 (glass substrate 11a) opposite to that formed with the sub panel driver IC 13, to enclose the display area 10a of the sub panel 10. Each of FIGS. 4 and 5 illustrates the lens sheets 36 and the diffusion sheet 37 as a single sheet 30 while illustrating lens sheets 51 and a diffusion sheet 52 described later as a single sheet 50, in order to simplify the illustration.

As shown in FIGS. 3 and 12, an insulating sheet 46 is provided on a prescribed region of the surface of the bezel 43 closer to the sub panel 10, in order to insulate the bezel 43 from an electronic component (not shown) mounted on the common FPC 42.

As shown in FIG. 3, the two lens sheets 51 and the diffusion sheet 52 are arranged on the surface of the light guide 35 closer to the main panel 20 within the resin frame 31 successively from the side closer to the light guide 35. A rectangular screen sheet 53 having an opening 53a is arranged on a surface of the diffusion sheet 52 closer to the main panel 20. This screen sheet 53 has a function of inhibiting the light emitted from the LEDs 33 from leaking through any region of the main panel 20 other than the display area 20a. In other words, the opening 53a of the screen sheet 53 is provided on a region corresponding to the display area 20a of the main panel 20.

Figure 14:
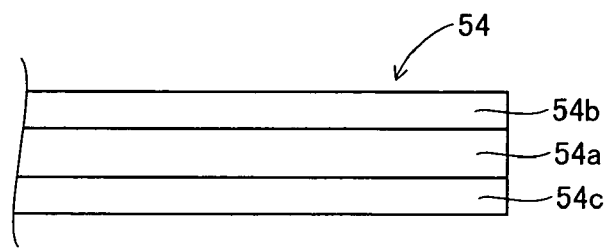
FIG. 14 is a schematic diagram showing a weak double-faced adhesive tape used for bonding an LED-FPC and the screen sheet of the LCD unit according to the embodiment shown in FIG. 1.
Figure 15:
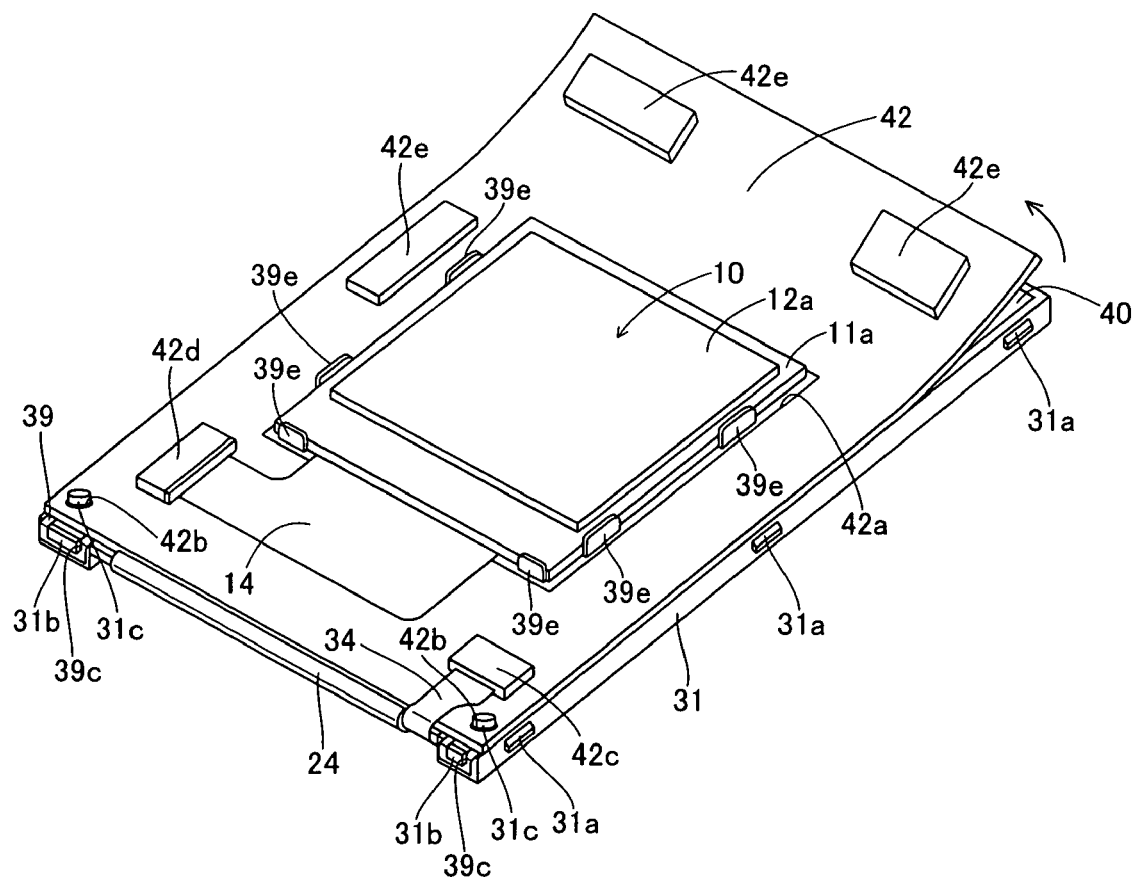
FIGS. 15 to 17 are perspective views for illustrating the procedure for disassembling the LCD unit according to the embodiment of the present invention.

According to this embodiment, the weak double-faced adhesive tape (No. 5690 by Nitto Denko Corporation) 54 is bonded along an end of the screen sheet 53, formed by a double-faced adhesive tape having high adhesive strength on both surfaces thereof, closer to the LED-FPC 34. The double-faced adhesive tape 54 is rendered to have a length substantially identical to the short-side width of the screen sheet 53 in the state bonded to the screen sheet 53. This weak double-faced adhesive tape 54 is formed by a polyester film 54a of about 12 μm in thickness coated with the weak and strong adhesive layers 54b and 54c each having a thickness of about 9 μm on both surfaces thereof respectively, as shown in FIG. 14. As shown in FIG. 3, the strong adhesive layer 54c and the weak adhesive layer 54b of the weak double-face adhesive tape 54 are bonded to the surfaces of the screen sheet 53 and the LED-FPC 34 respectively.

The adhesive strength of the double-faced adhesive tape 54 according to this embodiment is now described. In order to separate the weak adhesive layer 54b of the double-faced adhesive tape 54 from a stainless steel substrate by 20 mm in a direction of 180°, peel force of about 2.5 N is necessary. Therefore, the weak adhesive layer 54b of the double-faced adhesive tape 54 is bonded to the stainless steel substrate with adhesive strength of about 2.5 N. In order to separate the strong adhesive layer 54c of the double-faced adhesive tape 54 from a stainless steel substrate by 20 mm in a direction of 180°, on the other hand, peel force of about 8.0 N is necessary. Therefore, the strong adhesive layer 40c of the double-faced adhesive tape 54 is bonded to the stainless steel substrate with adhesive strength of about 8.0 N. In other words, the adhesive strength (about 2.5 N) of the weak adhesive layer 54b of the double-faced adhesive tape 54 bonded to the LED-FPC 34 is lower than the adhesive strength (about 8.0 N) of the strong adhesive layer 54c of the double-faced adhesive tape 54 bonded to the screen sheet 53.

According to this embodiment, further, the weak adhesive layer 54b of the double-faced adhesive tape 54 has the adhesive strength (2.5 N) allowing separation of the LED-FPC 34 and the LEDs 33 in a recyclable state when the LED-FPC 34 is separated from the main panel 20. In addition, the adhesive strength (about 2.5 N) of the weak adhesive layer 54b of the double-faced adhesive tape 54 is lower than the adhesive strength of the screen sheet 53 formed by the double-faced adhesive tape having high adhesive strength on both surfaces thereof.

Figure 11:
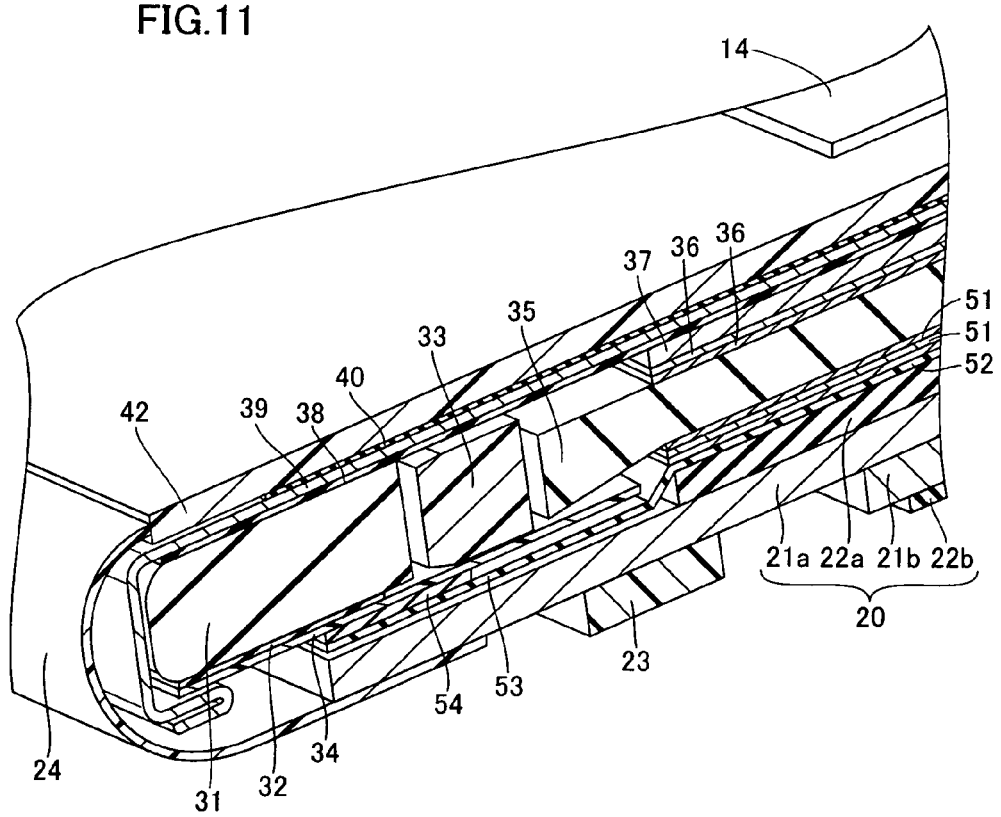
FIG. 11 is a sectional view taken along the line 300-300 in FIG. 10.

A region of the outer edge of the screen sheet 53 provided with no double-faced adhesive tape 54 is bonded to the two long sides and the two short sides of the resin frame 31. As shown in FIGS. 3 and 11, an end of the screen sheet 53 closer to the LED-FPC 34 is bonded to the LED-FPC 34 through the weak double-faced adhesive tape 54. Thus, the lens sheets 51 and the diffusion sheet 52 located between the light guide 35 and the screen sheet 53 are fixed to the resin frame 31.

As shown in FIG. 3, the outer edge of the glass substrate 21a of the main panel 20 is bonded to the screen sheet 53 within the resin frame 31.

FIGS. 15 to 19 are diagrams for illustrating the procedure for disassembling the LCD unit according to the embodiment of the present invention. The procedure for disassembling the LCD unit according to this embodiment is now described with reference to FIGS. 3, 4, 10 and 15 to 19.

In order to disassemble the sub panel 10 of the LCD unit, the engaging holes 43b of the bezel 43 and the engaging sections 31a of the resin frame 31 shown in FIG. 3 are disengaged from each other. Since the cushion layer 44 bonded to the bezel 43 is not bonded to the sub panel 10 as shown in FIG. 4, the bezel 34 is detached from the resin frame 31 due to the aforementioned disengagement between the bezel 43 and the resin frame 31, as shown in FIG. 10.

Figure 16:
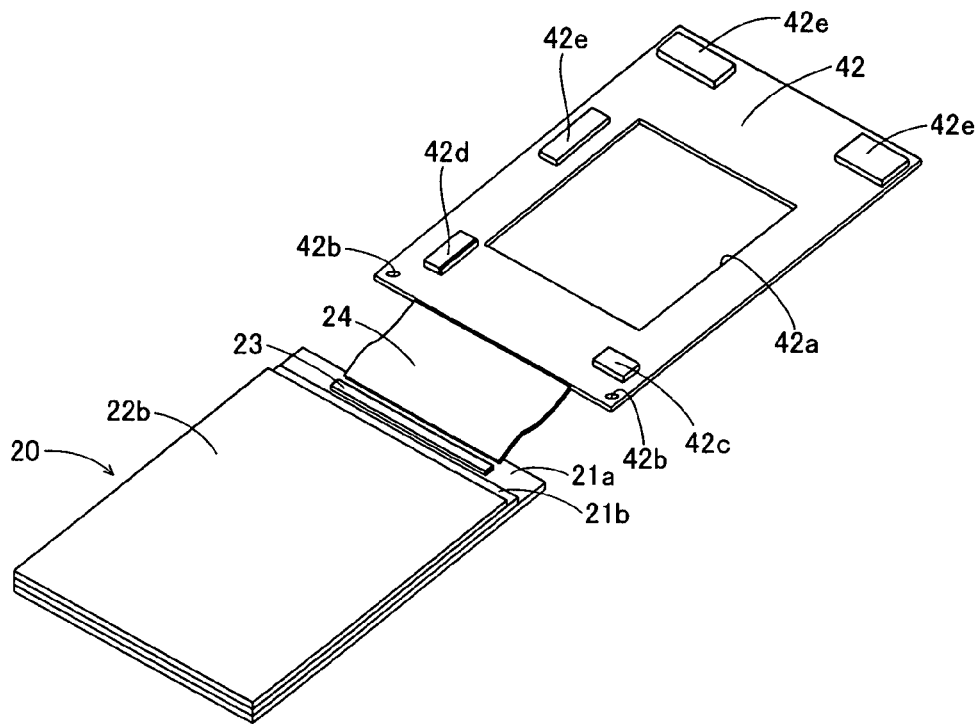

Then, the common FPC 42 is detached from the state shown in FIG. 10. More specifically, the common FPC 42 is separated from the weak double-faced adhesive tape 40 bonding the common FPC 42 and the reinforcing frame 39 to each other, as shown in FIG. 16.

Figure 17:
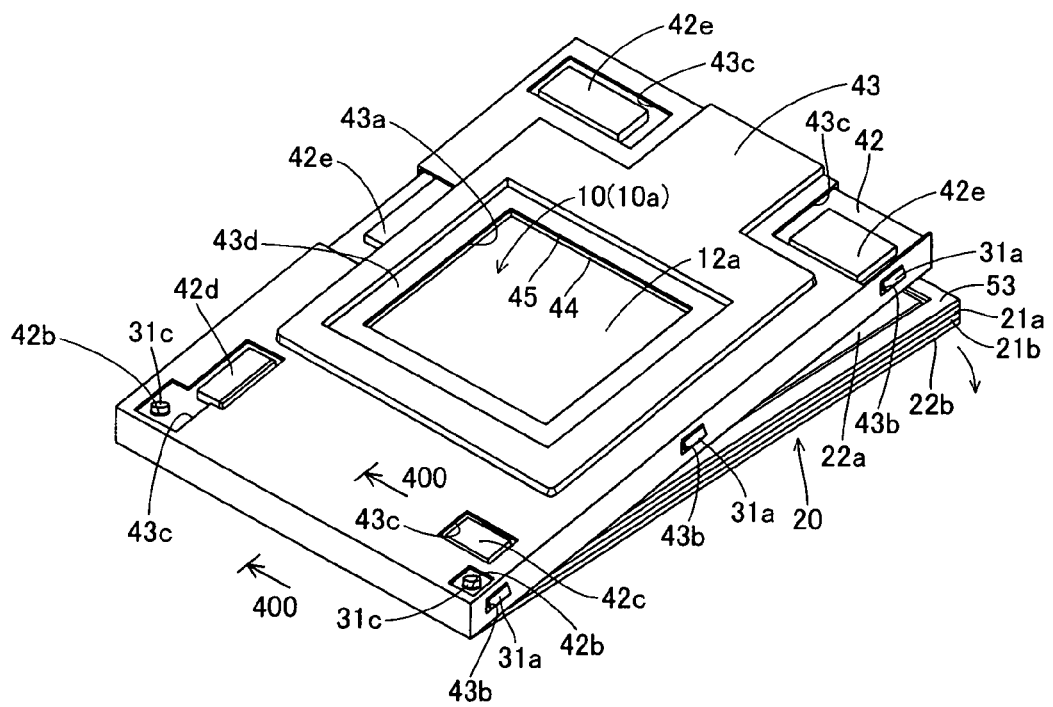
Figure 18:
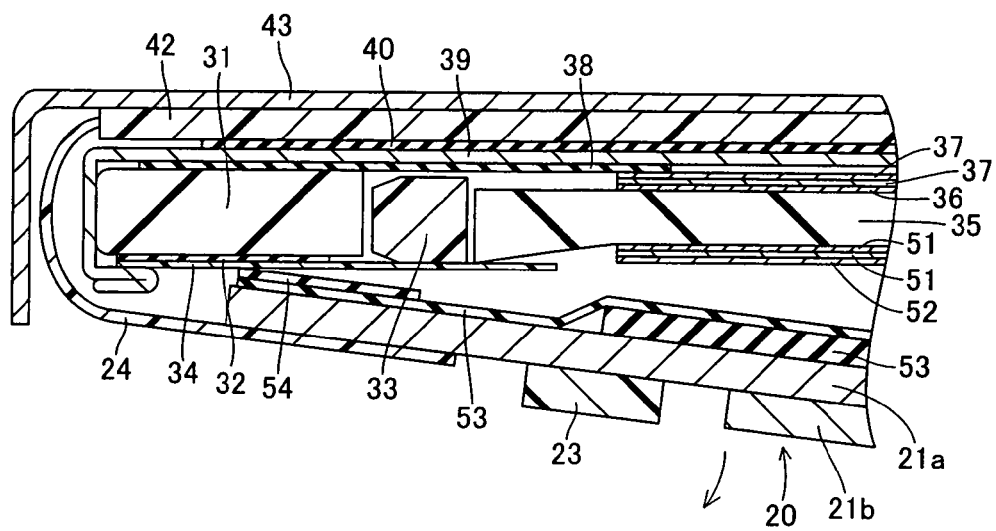
FIG. 18 is a sectional view taken along the line 400-400 in FIG. 17.
Figure 19:
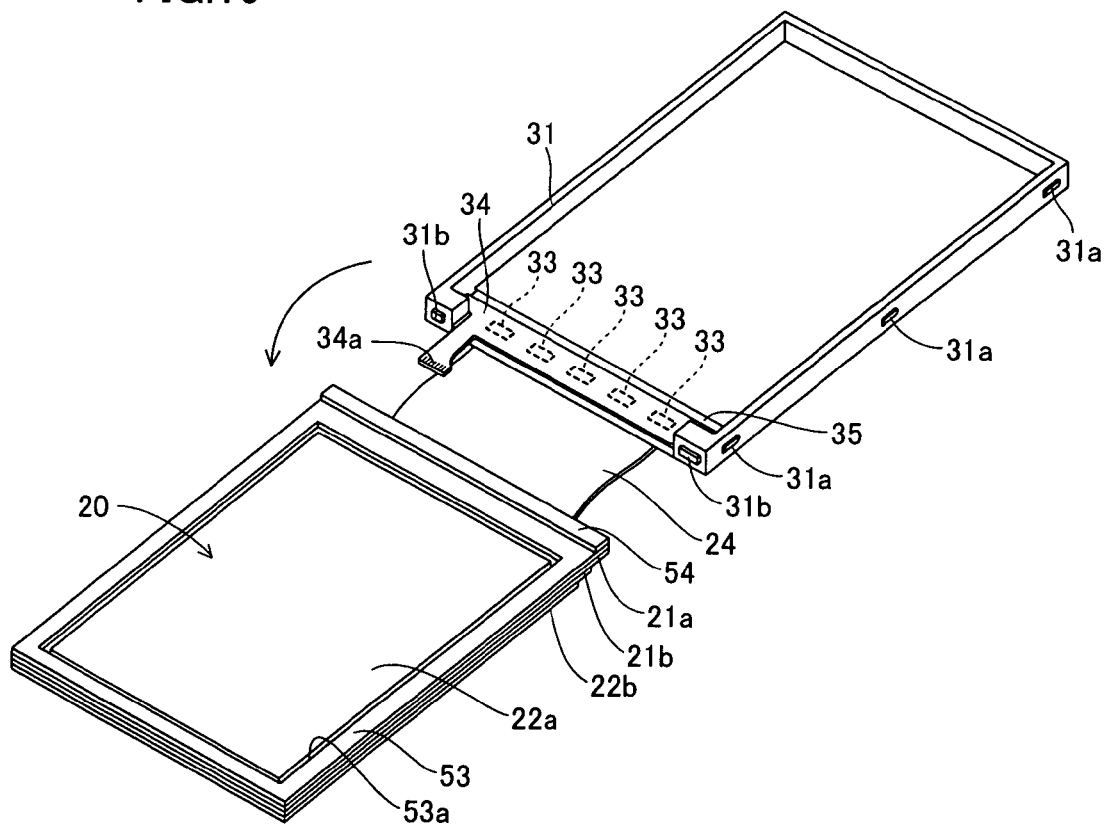
FIG. 19 is still another perspective view for illustrating the procedure for disassembling the LCD unit according to the embodiment of the present invention.

In order to disassemble the main panel 20 of the LCD unit, the screen sheet 53 bonded to the resin frame 31 (see FIG. 3) is separated from the resin frame 31 along with the main panel 20, as shown in FIG. 17. As shown in FIG. 18, the weak double-faced adhesive tape 54 bonded to the LED-FPC 43 is separated from the LED-FPC 34 along with the screen sheet 53 (main panel 20), as shown in FIG. 19.

According to this embodiment, as hereinabove described, the adhesive strength (about 2.5 N) of the weak adhesive layer 54b of the weak double-faced adhesive tape 54 bonded to the LED-FPC 34 is lower than the adhesive strength (about 8.0) of the strong adhesive layer 54c bonded to the main panel 20, whereby the LED-FPC 34 bonded to the main panel 20 through the double-faced adhesive tape 54 can be easily separated from the main panel 20 due to the lower adhesive strength of the weak adhesive layer 54b of the double-faced adhesive tape 54 bonded to the LED-FPC 34 as compared with the adhesive strength of the strong adhesive layer 54b of the double-faced adhesive tape 54 bonded to the main panel 20. Thus, the LED-FPC 34 bonded to the main panel 20 can be separated with peel force of about 2.5 N, whereby the LED-FPC 34 can be prevented from application of a load exceeding about 2.5 N. Thus, the LED-FPC 34 can be inhibited from deformation resulting from a load exceeding about 2.5 N applied thereto, whereby the LEDs 33 mounted on the LED-FPC 34 can be inhibited from breakage and the LED-FPC 34 can be inhibited from disconnection. Consequently, the LED-FPC 34 bonded to the main panel 20 (screen sheet 53) through the double-faced adhesive tape 54 and the LEDs 33 can be separated in a recyclable state, whereby the LCD unit can be reassembled with the recyclable LED-FPC 34 and the recyclable LEDs 33.

According to this embodiment, the adhesive strength (about 2.5 N) of the weak adhesive layer 54b of the double-faced adhesive tape 54 bonded to the LED-FPC 34 is lower than the adhesive strength (about 6.0 N) of the surfaces of the double-faced adhesive tape 34 bonded to the resin frame 31 and the LED-FPC 34 respectively, whereby the LED-FPC 34 can be bonded to the main panel 20 with the weak adhesive strength of about 2.5 N through the double-faced adhesive tape 54 including the weak adhesive layer 54b having the low adhesive strength while strongly bonding the LED-FPC 34 to the resin frame 31 with the adhesive strength of about 6.0 N through the double-faced adhesive tape 32 having the high adhesive strength. Consequently, the LED-FPC 34 bonded through the double-faced adhesive tapes 54 and 32 can be easily separated from the main panel 20 (screen sheet 53).

According to this embodiment, the double-faced adhesive tape 54 is provided along the end of the rectangular screen sheet 53 closer to the LED-FPC 34 so that the LED-FPC 34 is bonded through the double-faced adhesive tape 54 including the weak adhesive layer 54b having the low adhesive strength provided along the end of the screen sheet 53 closer to the LED-FPC 34, whereby the LED-FPC 34 can be inhibited from strong bonding to the end of the screen sheet 53 having high adhesive strength. Thus, the LED-FPC 34 can be more easily separated from the end of the screen sheet 53.

According to this embodiment, as hereinabove described, the cushion layer 44 of the foaming material is so arranged between the bezel 43 and the surface of the sub panel 10 that the LCD unit can absorb external force applied from the side of the bezel 43 with the cushion layer 44. Thus, the external force applied from the side of the bezel 43 can be inhibited from transmission to the sub panel 10, whereby the sub panel 10 can be inhibited from cracking.

According to this embodiment, the cushion layer 44 is arranged between the bezel 43 and the surface of the sub panel 10 not to be bonded to the surface of the sub panel 10 so that no force is generated to pull the bezel 43 toward the sub panel 10 when the bezel 43 is detached from the sub panel 10 along with the cushion layer 44, whereby the bezel 43 can be inhibited from deformation. Consequently, the bezel 43 can be recycled after disassembling of the LCD unit (after the bezel 43 is detached from the sub panel 10).

According to this embodiment, the cushion layer 44 is arranged between the bezel 34 and the surface of the sub panel 10 to enclose the display area 10a of the sub panel 10, whereby the external force applied from the side of the bezel 43 can be inhibited from transmission to the region (non-display area 10b) of the sub panel 10 enclosing the display area 10a. In this case, the cushion layer 44 can be easily arranged between the bezel 43 and the surface of the sub panel 10 to enclose the display area 10a of the sub panel 10 by bonding the cushion layer 44 along the surface of the portion close to the outer edge of the opening 43a of the bezel 43.

According to this embodiment, the recess portion 43d is formed by drawing along the outer edge of the opening 43a of the bezel 43, for improving torsional strength of the bezel 43 with the recess portion 43d formed by drawing. Thus, the bezel 43 can be further inhibited from deformation when detached from the sub panel 10 along with the cushion layer 44. Further, the bezel 43, improved in torsional strength by the recess portion 43d formed by drawing, can be inhibited from warpage. Thus, the surface of the sub panel 10 and the cushion layer 44 can be inhibited from forming a noncontact portion (clearance) resulting from deformation of the cushion layer 44 caused by warpage of the bezel 43. Consequently, introduction of dust or leakage of light through a clearance between the surface of the sub panel 10 and the cushion layer 44 can be suppressed.

According to this embodiment, the recess portion 43d of the bezel 43 formed by drawing is provided along the overall region of the outer edge of the opening 43a so that the torsional strength of the bezel 43 can be more improved as compared with a case of only partially forming the recess portion 43d on the outer edge of the opening 43a, whereby the bezel 43 can be further inhibited from deformation and warpage.

According to this embodiment, the bezel 43 having the recess portion 43d formed by drawing is so attached to the resin frame 31 provided with the light guide 35 that the resin frame 31 can be inhibited from deformation along with the bezel 43 improved in torsional strength due to the recess portion 43d formed by drawing. Thus, the light guide 35 set on the resin frame 31 can be so inhibited from deformation that defective display resulting from deformation of the light guide 35 can be suppressed. In this case, the diffusion sheet 37 can also be inhibited from deformation along with the light guide 35 set on the resin frame 31. Thus, the diffusion sheet 37 can be inhibited from coming into contact with the sub panel 10 in a deformed state and forming Newton ring patterns (stripes).

According to this embodiment having the aforementioned structure, the external force applied from the side of the bezel 43 can be inhibited from transmission to the sub panel driver IC 13 of the sub panel 10 due to the cushion layer 44 in the LCD unit having the sub panel driver IC 13 provided on the non-display area 10b of the sub panel 10, whereby the sub panel driver IC 13 can be inhibited from breakage. In this case, the sub panel driver IC 13 is so provided on the non-display area 10b on the surface of the sub panel 10 (glass substrate 11a) opposite to that closer to the cushion layer 44 that the distance between the bezel 43 and the region of the sub panel 10 provided with the sub panel driver IC 13 can be increased to a level corresponding to the total of the thicknesses of the cushion layer 44 and the glass substrate 11a of the sub panel 10, whereby the external force applied from the side of the bezel 43 can be further inhibited from transmission to the region of the sub panel 10 provided with the sub panel driver IC 13. Thus, the sub panel driver IC 13 can be further inhibited from breakage.

According to this embodiment, as hereinabove described, the adhesive strength (about 2.5 N) of the weak adhesive layer 40b of the double-faced adhesive tape 40 bonded to the common FPC 42 is lower than the adhesive strength (about 8.0 N) of the strong adhesive layer 40c of the double-faced adhesive tape 40 bonded to the reinforcing plate 39, whereby the common FPC 42 can be easily separated from the reinforcing plate 39 due to the lower adhesive strength between the weak adhesive layer 40b of the double-faced adhesive tape 40 and the common FPC 42 as compared with the adhesive strength between the strong adhesive layer 40c of the double-faced adhesive tape 40 and the reinforcing plate 39 when the common FPC 42 bonded to the reinforcing plate 39 through the double-faced adhesive tape 40 is separated from the reinforcing plate 39. Thus, the common FPC 42 can be separated from the reinforcing plate 39 with peeling force of about 2.5 N, whereby the common FPC 42 can be inhibited from application of force exceeding about 2.5 N. Therefore, the common FPC 42 can be inhibited from deformation resulting from force exceeding about 2.5 N applied thereto, whereby the connectors 42c to 42e mounted on the common FPC 42 can be inhibited from contact failures and wires of the common FPC 42 can be inhibited from disconnection. Further, the reinforcing plate 39, also inhibited from application of force exceeding about 2.5 N, can also be inhibited from deformation resulting from force exceeding about 2.5 N applied thereto. Consequently, the common FPC 42 and the reinforcing plate 39 bonded to each other through the double-faced adhesive tape 40 can be separated from each other in a recyclable state, whereby the LCD unit can be reassembled with the recyclable common FPC 42 and the recyclable reinforcing plate 39.

According to this embodiment, the common FPC 42 can be so easily separated from the reinforcing plate 39 that the position for bonding the common FPC 42 can be easily corrected in assembling, whereby workability in assembling can be improved.

According to this embodiment, the double-faced adhesive tape 40 has the adhesive strength (about 2.5 N) allowing no debonding between the reinforcing plate 39 and the common FPC 42 when the terminal 34a of the LED-FPC 34 connected to the connector 42c of the common FPC 42 and the terminal 14a of the sub panel FPC 14 connected to the connector 42d are attached/detached while allowing separation of the common FPC 42 in a recyclable state when the common FPC 42 is separated from the reinforcing plate 39, whereby the common FPC 42 and the reinforcing plate 39 can be inhibited from separation also when force is applied in a direction for separating the common FPC 42 and the reinforcing plate 39 from each other due to the terminals 34a and 14a of the LED-FPC 34 and the common FPC 42 attached/detached to/from the connectors 42c and 42d of the common FPC 42. Consequently, the terminals 34a and 14a of the LED-FPC 34 and the common FPC 42 can be attached/detached to/from the connectors 42c and 42d of the common FPC 42 respectively without separating the common FPC 42 and the reinforcing plate 39 from each other despite the double-faced adhesive tape 40 allowing separation of the common FPC 42 in a recyclable state.

According to this embodiment, the double-faced adhesive tape 41 for bonding the sub panel 10 and the reinforcing plate 39 to each other is provided on the edge of the opening 39a of the reinforcing plate 39 while the adhesive strength (about 2.5 N) of the weak adhesive layer 40b of the double-faced adhesive tape 40 bonded to the common FPC 42 is rendered lower than the adhesive strength (about 6.0 N) of the surfaces of the double-faced adhesive tape 41 bonded to the sub panel 10 and the reinforcing plate 39, whereby the sub panel 10 can be strongly bonded to the reinforcing plate 39 through the double-faced adhesive tape 41 having the high adhesive strength while bonding the common FPC 42 to the reinforcing plate 39 in a recyclable state through the double-faced adhesive tape 40 including the weak adhesive layer 40b having the low adhesive strength to be separable in a recyclable state.

According to this embodiment, the opening 42a is provided on the common FPC 42 to expose the display area 10a of the sub panel 10 while the double-faced adhesive tape 40 is so arranged on the surface of the reinforcing plate 39 as to correspond to the remaining region of the common FPC 42 other than the opening 42a so that the common FPC 42 can be easily separated from the reinforcing plate 39 also when the mechanical strength thereof is reduced, whereby the common FPC 42 reduced in low mechanical strength can be inhibited from disconnection or the like. Consequently, the common FPC 42 provided with the opening 42a can be recycled after the same is separated from the reinforcing plate 39.

According to this embodiment, the double-faced adhesive tape 40 is so employed that the main panel FPC 24 connecting the common FPC 42 and the main panel 20 with each other can be inhibited from disconnection despite the main panel driver IC 23 electrically connected with the main panel driver IC 23 and provided on the non-display area 20b of the main panel 20 when the common FPC 42 is separated from the reinforcing plate 39, whereby the main panel 20 provided with the main panel driver IC 23 can be recycled.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the LCD unit (liquid crystal display), the present invention is not restricted to this but is also applicable to a display other than the LCD unit such as an organic EL display, for example.

While the weak adhesive layer 54b of the double-faced adhesive tape 54 (No. 5690 by Nitto Denko Corporation) bonded to the LED-FPC 34 has the adhesive strength of about 2.5 N in the aforementioned embodiment, the present invention is not restricted to this but another double-faced adhesive tape including a weak adhesive layer having adhesive strength other than the aforementioned value of about 2.5 N may alternatively be employed so far as the adhesive strength allows recycling of the LED-FPC 34 and the LEDs 33 when the LED-FPC 34 is separated from the main panel 20.

Figure 13:
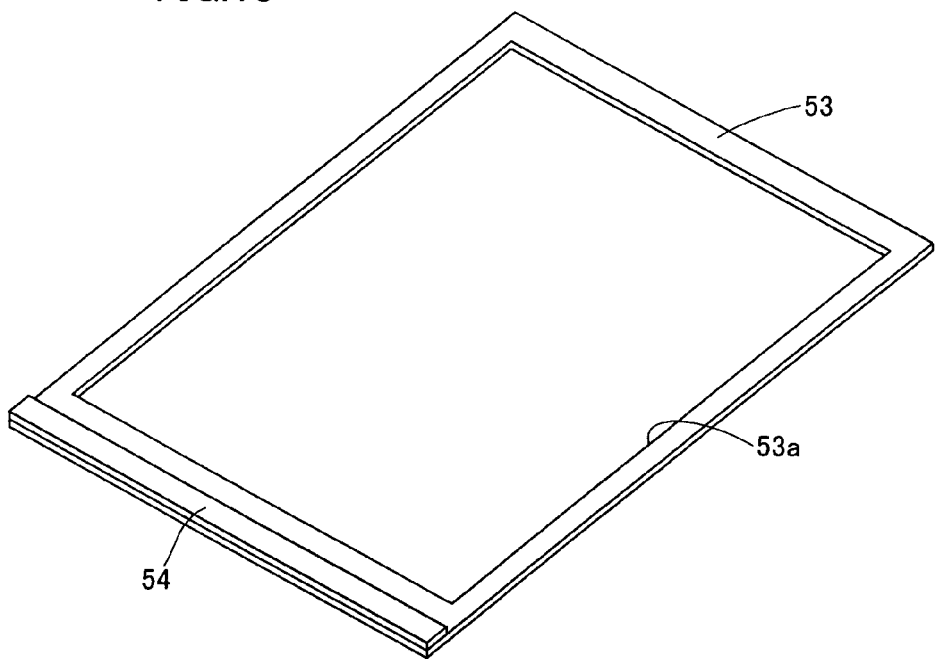
FIG. 13 is a perspective view showing a screen sheet of the LCD unit according to the embodiment shown in FIG. 1.
Figure 20:
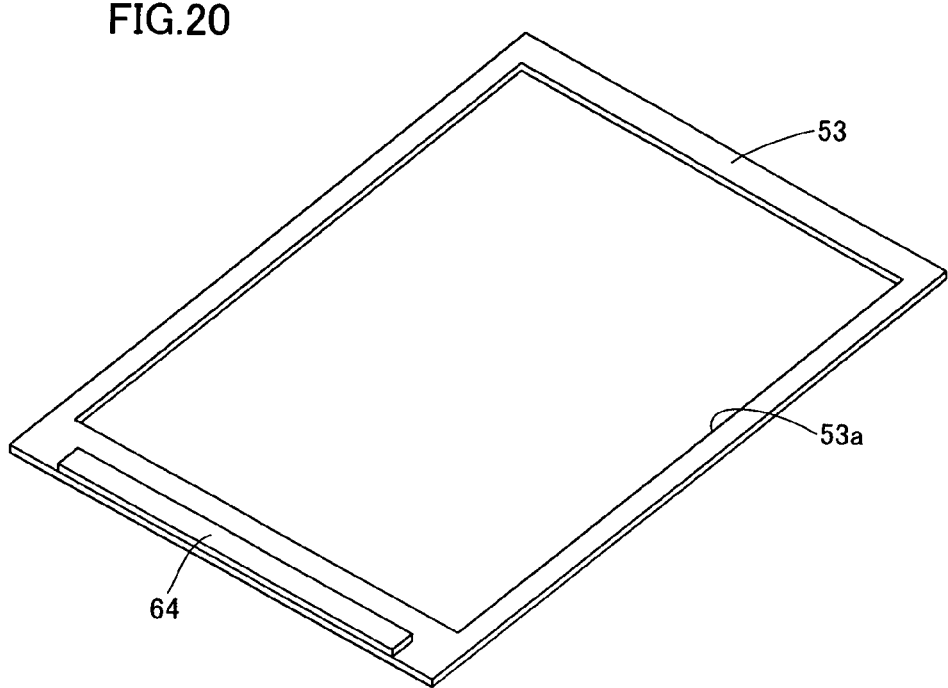
FIG. 20 is a perspective view showing a double-faced adhesive tape of an LCD unit according to a first modification of the embodiment shown in FIG. 1.

While the double-faced adhesive tape 54 having the length substantially identical to the short-side width of the screen sheet 53 is bonded along the overall length of the portion of the end of the screen sheet 53 closer to the LED-FPC 34 extending in the short-side direction as shown in FIG. 13 in the aforementioned embodiment, the present invention is not restricted to this but a double-faced adhesive tape 64 having a length smaller than the short-side width of a screen sheet 53 may alternatively be bonded partially along a portion of an end of the screen sheet 53 closer to an LED-FPC 34 extending in the short-side direction, as in a first modification of the embodiment shown in FIG. 20.

Figure 21:
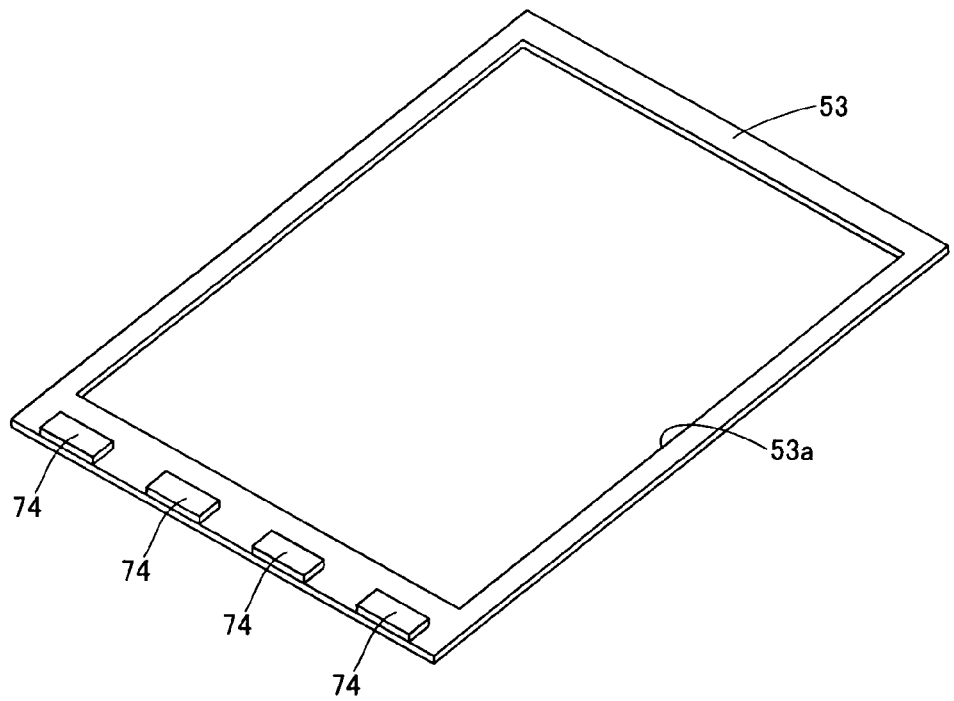
FIG. 21 is a perspective view showing a double-faced adhesive tape of an LCD unit according to a second modification of the embodiment shown in FIG. 1.
Figure 22:
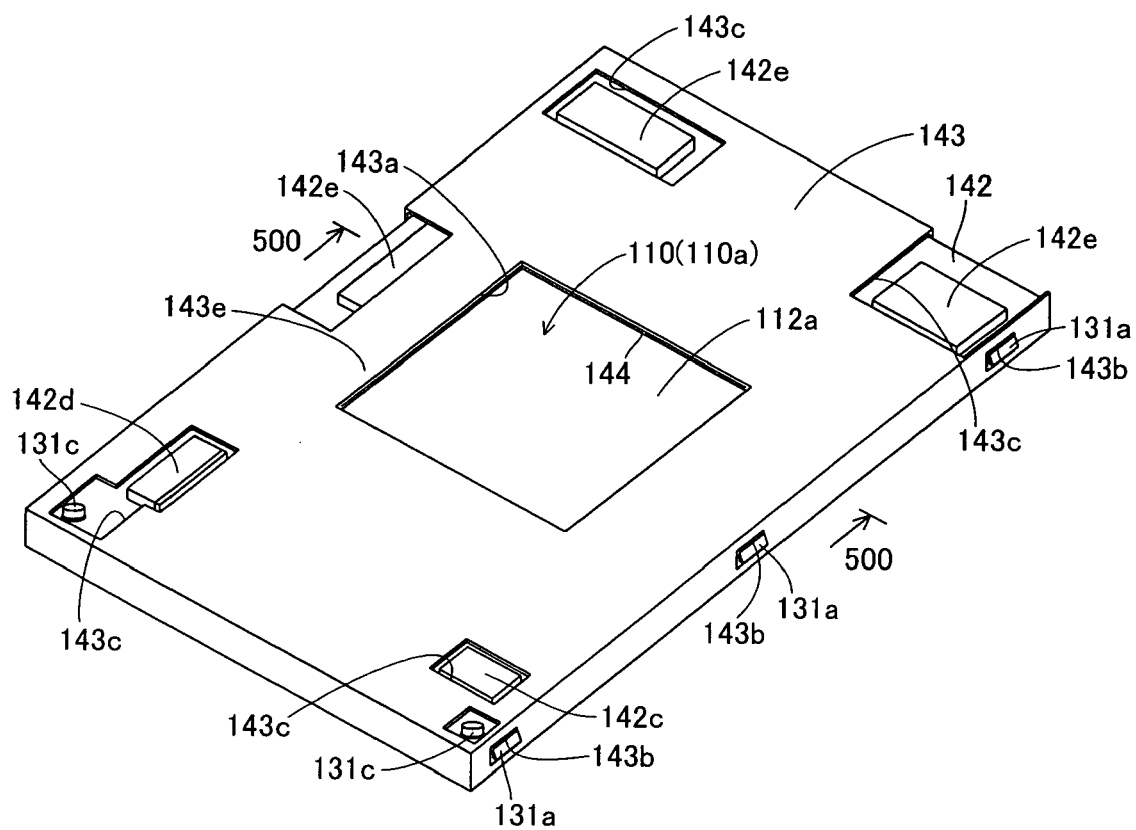
FIG. 22 is a perspective view showing the structure of a conventional LCD unit including two display panels.
Figure 23:
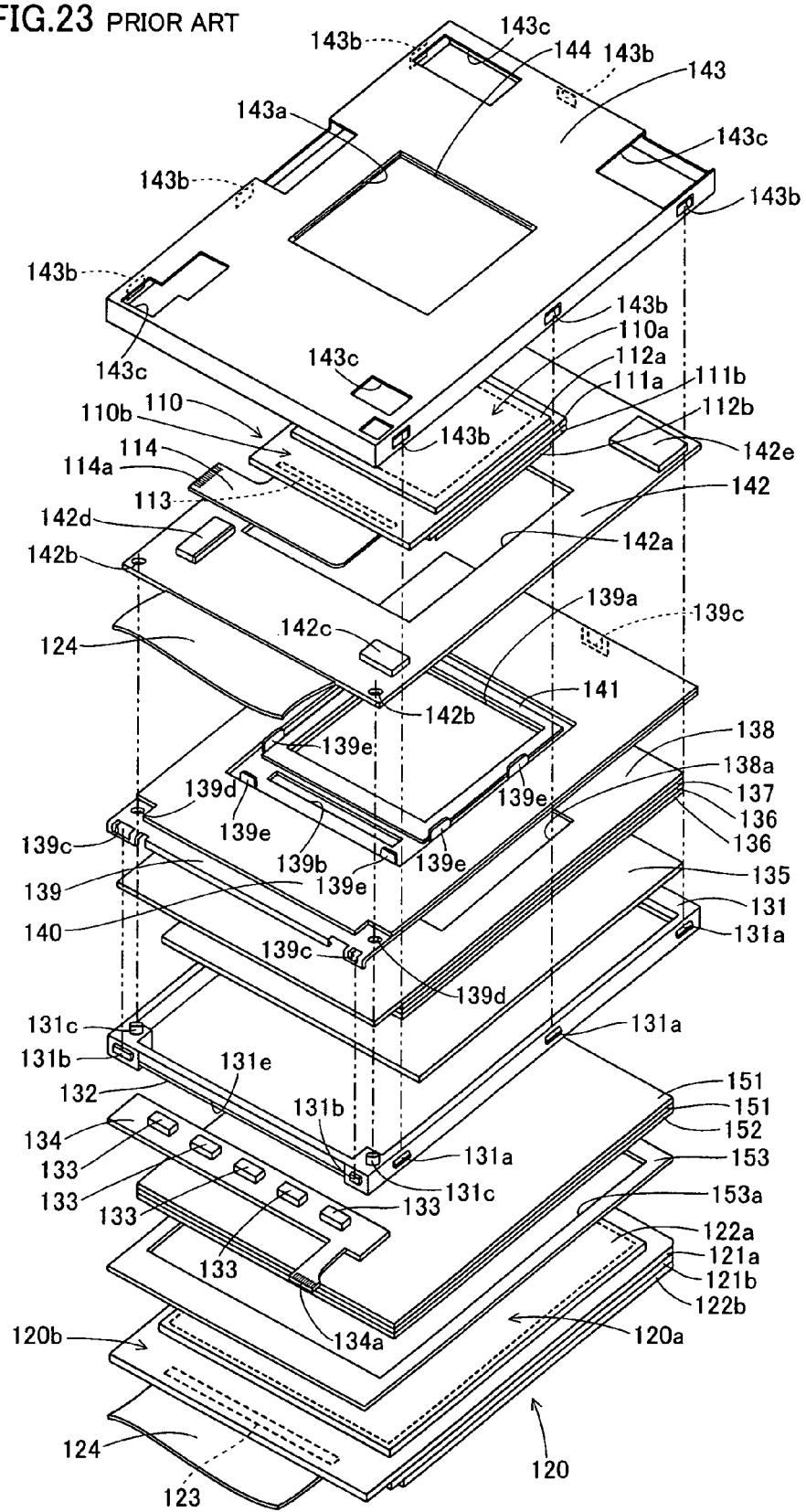
FIG. 23 is an exploded perspective view of the conventional LCD unit shown in FIG. 22.
Figure 24:
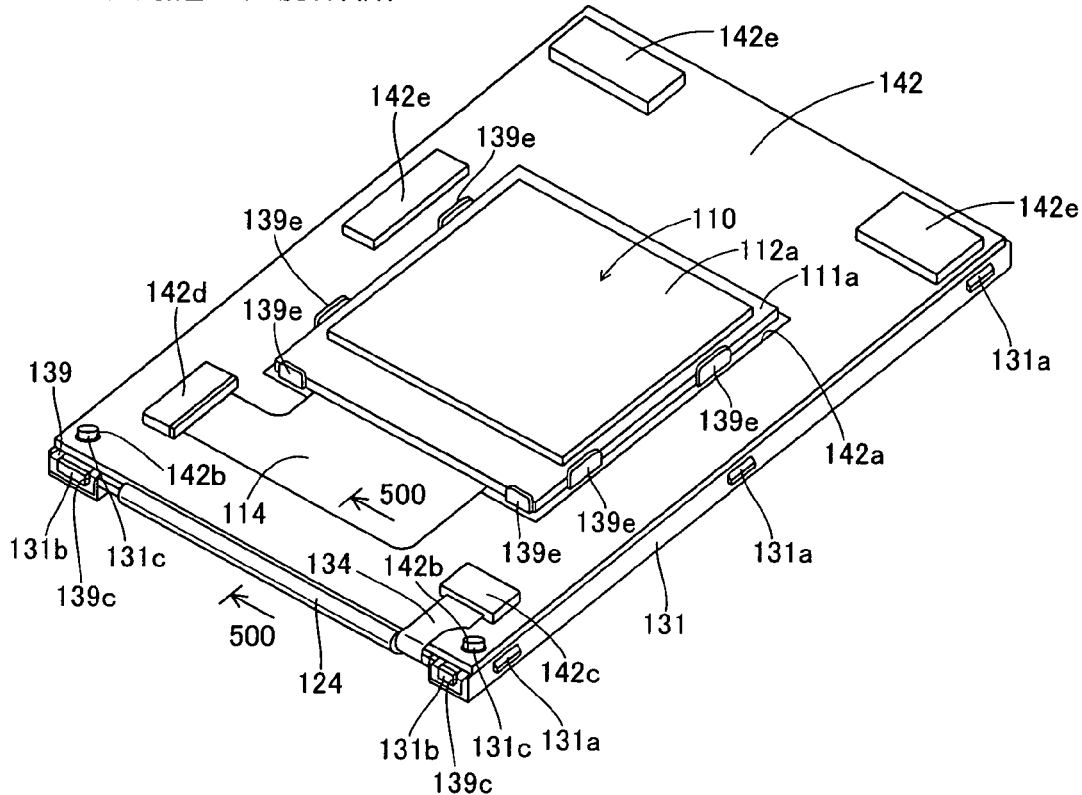
FIG. 24 is a perspective view of the conventional LCD unit shown in FIG. 22, from which a bezel is detached.
Figure 25:
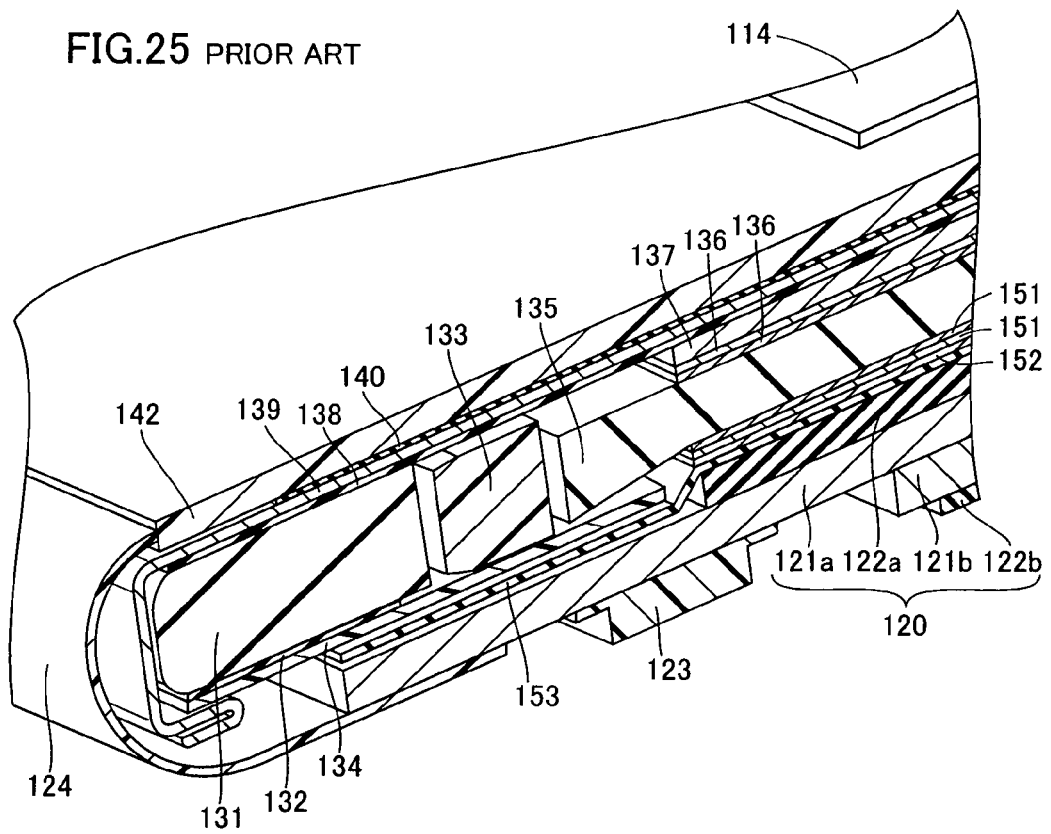
FIG. 25 is a sectional view taken along the line 500-500 in FIG. 24.
Figure 26:
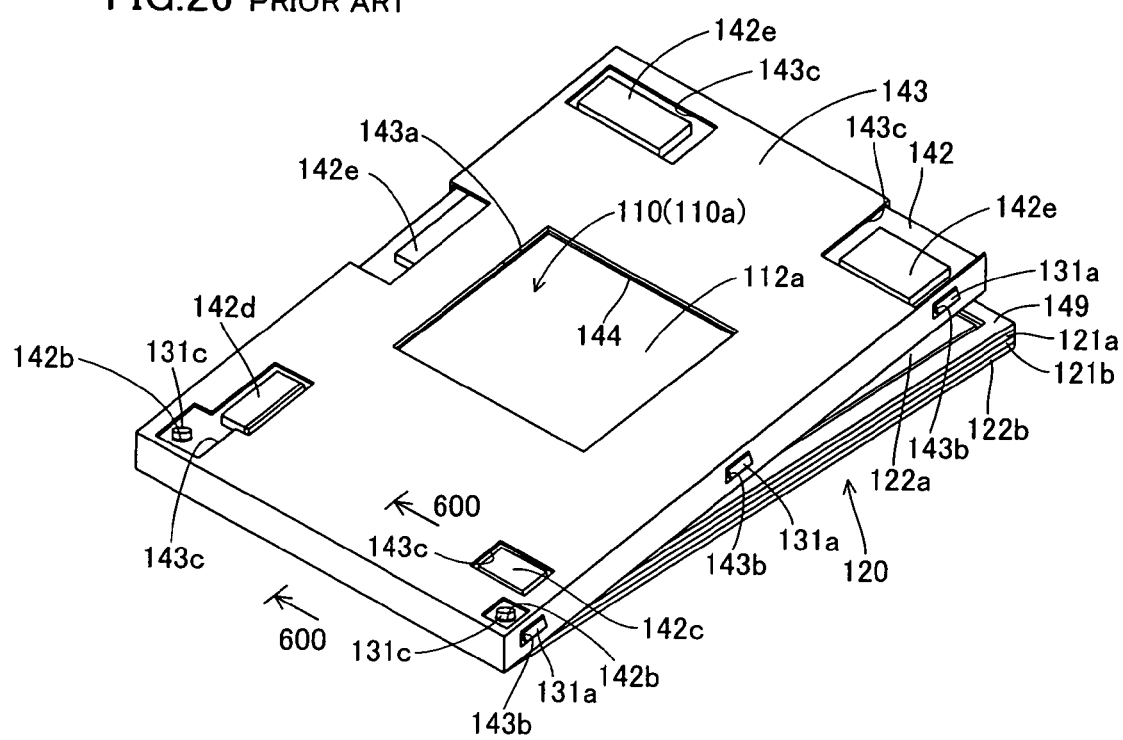
FIG. 26 is a perspective view showing a state of detaching a main panel from a resin frame in the conventional LCD unit shown in FIG. 22.

While the double-faced adhesive tape 54 is bonded along the overall length of the portion of the end of the screen sheet 53 closer to the LED-FPC 34 extending in the short-side direction as shown in FIG. 13 in the aforementioned embodiment, the present invention is not restricted to this but a plurality of double-faced adhesive tapes 74 may alternatively be partially bonded to a portion of an end of a screen sheet 53 closer to an LED-FPC 34 extending in the short-side direction at prescribed intervals, as in a second modification of the embodiment shown in FIG. 21.

While the aforementioned embodiment of the present invention is applied to the display including two display panels (the sub panel 10 and the main panel 20), the present invention is not restricted to this but is also applicable to a display including only a single display panel.

While the resin frame 31 and the LED-FPC 34 are bonded to each other through the double-faced adhesive tape (No. 532 by Nitto Denko Corporation) 32 having high adhesive strength on both surfaces thereof in the aforementioned embodiment, the present invention is not restricted to this but the LEDs 33 mounted on the LED-FPC 34 may alternatively be mounted on the resin frame 31 in a fixable manner.

While the LEDs (light-emitting diodes) 33 are employed as the light source mounted on the LED-FPC 34 in the aforementioned embodiment, the present invention is not restricted to this but a light source other than the LEDs may alternatively be employed.

While the cushion layer 44 is arranged between the bezel 43 and the sub panel 10 on the side of the sub panel 10 in the aforementioned embodiment, the present invention is not restricted to this but the bezel 43 may alternatively be provided on the side of the main panel 20 so that the cushion layer 44 is arranged between the bezel 34 and the main panel 20.

While the recess portion 43d is formed by drawing on the overall region of the outer edge of the opening 43a of the bezel 43 in the aforementioned embodiment, the present invention is not restricted to this but the recess portion 43d may alternatively be only partially formed on the outer edge of the opening 43a of the bezel 43.

While the cushion layer 44 of the foaming material is employed as the buffer member of the present invention in the aforementioned embodiment, the present invention is not restricted to this but a cushion member of a material other than the foaming material may alternatively be employed.

While the sub panel driver IC 13 is formed on the glass substrate 11a of the sub panel 10 in the aforementioned embodiment, the present invention is not restricted to this but the sub panel driver IC 13 may alternatively be provided independently of the sub panel 10.

While the weak adhesive layer 40b of the double-faced adhesive tape 40 (No. 5690 by Nitto Denko Corporation) bonded to the common FPC 42 has the adhesive strength of about 2.5 N in the aforementioned embodiment, the present invention is not restricted to this but the double-faced adhesive tape 40 may alternatively include a weak adhesive layer having adhesive strength other than the aforementioned value of about 2.5 N so far as the adhesive strength causes no debonding between the reinforcing plate 39 and the common FPC 42 when the terminals 34a and 14a of the LED-FPC 34 and the sub panel FPC 14 connected to the connectors 42c and 42d of the common FPC 42 are attached/detached while allowing separation of the common FPC 42 from the reinforcing plate 39 in a recyclable state.

While the strong double-faced adhesive tape 41 is provided on the region along the outer edge of the opening 39a of the reinforcing plate 39 for bonding the reinforcing plate 39 and the sub panel 10 to each other in the aforementioned embodiment, the present invention is not restricted to this but the sub panel 10 may alternatively be stopped through the protrusions 39e of the reinforcing plate 39 without employing the double-faced adhesive tape 41.

While the main panel driver IC 23 and the sub panel driver IC 13 are formed on the non-display areas 20b and 10b of the main panel 20 and the sub panel 10 respectively in the aforementioned embodiment, the present invention is not restricted to this but the main panel driver IC 23 and the sub panel driver IC 13 may alternatively be formed on the common FPC 42 or another region.

While the common FPC 42 is bonded to the reinforcing plate 39 formed by the stainless steel sheet in the aforementioned embodiment, the present invention is not restricted to this but the reinforcing plate 39 may alternatively be made of a metal other than stainless steel, or a resin material, for example, other than a metal.

What is claimed is:

1. A display comprising:
a first display panel;
a light source for supplying light to said first display panel;
a printed circuit board mounted with said light source;
a screen sheet arranged on said first display panel, having an opening corresponding to a display area of said first display panel; and
a first double-faced adhesive tape for attaching said printed circuit board to said screen sheet, wherein
the adhesive strength of a surface of said first double-faced adhesive tape bonded to said printed circuit board is lower than the adhesive strength of another surface of said first double-faced adhesive tape bonded to said screen sheet and lower than the adhesive strength of a surface of said screen sheet bonded to said first display panel.

2. The display according to claim 1, wherein
said first double-faced adhesive tape has adhesive strength allowing separation of said printed circuit board and said light source in a recyclable state when said printed circuit board is separated from said screen sheet.

3. The display according to claim 1, further comprising:
a frame for setting said light source mounted on said printed board, and
a second double-faced adhesive tape for bonding said frame and said printed circuit board to each other, wherein
the adhesive strength of said surface of said first double-faced adhesive tape bonded to said printed circuit board is lower than the adhesive strength of surfaces of said second double-faced adhesive tape bonded to said frame and said printed circuit board respectively.

4. The display according to claim 1, wherein
the outline of said screen sheet is formed in a shape corresponding to the outline of said first display panel in plan view, and
said first double-faced adhesive tape is provided along a portion around an end of a prescribed side of said screen sheet.

5. The display according to claim 1, further comprising a light guide formed in a shape corresponding to said first display panel for guiding said light emitted from said light source mounted on said printed circuit board to said first display panel, wherein
said printed circuit board mounted with said light source is so bonded to said screen sheet with said first double-faced adhesive tape as to arrange said light source on a position opposed to the surface of a prescribed side of said light guide.

6. The display according to claim 5, wherein
said light source includes a plurality of light-emitting diodes arranged along the extensional direction of said prescribed side of said light guide for applying said light to the surface of said prescribed side of said light guide.

7. The display according to claim 5, further comprising a second display panel opposed to said first display panel through said light guide, wherein
said light source and said light guide mounted on said printed circuit board are used for said first display panel and said second display panel in common.

8. A display comprising:
a frame having an opening;
a display panel, having a display area and a non-display area, opposed to said frame for exposing said display area through said opening of said frame; and
a buffer member arranged between said frame and the surface of said display panel not to be bonded to the surface of said display panel.

9. The display according to claim 8, wherein
said buffer member is made of a foaming material.

10. The display according to claim 8, wherein
said buffer member is arranged between said frame and the surface of said display panel to enclose said display area of said display panel.

11. The display according to claim 10, wherein
said buffer member is attached along the surface of a portion around the outer edge of said opening of said frame closer to said display panel.

12. The display according to claim 8, wherein
said frame is metallic,
said buffer member is arranged between the surface of said portion around the outer edge of said opening of said frame and the surface of said display panel, and
a recess portion is formed by drawing at least partially in the outer edge of said opening of said metallic frame.

13. A display comprising:
a display panel;
a printed circuit board electrically connected to said display panel;
a reinforcing member overlapped with said printed circuit board, for reinforcing said printed circuit board; and
one double-faced adhesive tape arranged between said printed circuit board and said reinforcing member for bonding said printed circuit board and said reinforcing member to each other, wherein
the adhesive strength of a surface of said one double-faced adhesive tape bonded to said printed circuit board is lower than the adhesive strength of another surface of said one double-faced adhesive tape bonded to said reinforcing member.

14. The display according to claim 13, wherein
a connector is mounted on the surface of said printed board opposed to the surface on which said reinforcing member is arranged, and
said one double-faced adhesive tape has adhesive strength allowing no debonding between said reinforcing member and said printed board when a connecting terminal connected to said connector of said printed circuit board is attached/detached while allowing separation of said printed circuit board in a recyclable state when said printed circuit board is separated from said reinforcing member.

15. The display according to claim 13, wherein
said reinforcing member includes a first opening on a portion corresponding to a display area of said display panel, the other double-faced adhesive tape is provided on an edge of said first opening of said reinforcing member for bonding said display panel and said reinforcing member to each other, and the adhesive strength of said surface of said one double-faced adhesive tape bonded to said printed circuit board is lower than the adhesive strength of surfaces of said the other double-faced adhesive tape bonded to said display panel and said reinforcing member respectively.

16. The display according to claim 13, wherein said printed circuit board includes a second opening so provided as to expose a display area of said display panel, and said one double-faced adhesive tape is so arranged on said reinforcing member as to correspond to the remaining region of said printed circuit board excluding said second opening.

17. The display according to claim 13, wherein a frame is arranged on the surface of said reinforcing member opposed to said printed circuit board, and said reinforcing member engages with said frame.

* * * * *